US012701465B2

(12) United States Patent
Lei

(10) Patent No.: US 12,701,465 B2
(45) Date of Patent: Aug. 4, 2026

(54) MANAGING SUBPACKET TRANSMISSION AND RECEPTION FOR ADVANCED INTERACTIVE SERVICES

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 620 days.

(21) Appl. No.: 17/989,301

(22) Filed: Nov. 17, 2022

(65) Prior Publication Data

US 2023/0083441 A1     Mar. 16, 2023

Related U.S. Application Data

(63) Continuation of application No. PCT/CN2021/131399, filed on Nov. 18, 2021.

(30) Foreign Application Priority Data

Jan. 4, 2021     (CN) .......................... 202110004590.5

(51) Int. Cl.
*H04W 28/00*          (2009.01)
*H04W 28/06*          (2009.01)
(52) U.S. Cl.
CPC .................................. *H04W 28/065* (2013.01)
(58) Field of Classification Search
None
See application file for complete search history.

(56) References Cited

U.S. PATENT DOCUMENTS 11,490,291 B2 * 11/2022 Talebi Fard ...... H04W 36/0016
2017/0054528 A1     2/2017 Pedersen et al.
(Continued)

FOREIGN PATENT DOCUMENTS

CN     110769380 A     2/2020
CN     112804711 A     5/2021
(Continued)

OTHER PUBLICATIONS

International Search Report and Written Opinion in PCT/CN2021/131399, mailed 2022-02-09, 11 pages.
(Continued)

*Primary Examiner* — Gerald A Smarth
(74) *Attorney, Agent, or Firm* — Arent Fox Schiff LLP

(57)     ABSTRACT
A data transmission method includes receiving access stratum context information, the access stratum context information indicating that different types of data packets of an advanced interactive service are transmitted in different GTP-U tunnels, and are transmitted by a same DRB. The method also includes, when a data packet transmitted by a user-plane functional entity through a GTP-U tunnel is a fragmented subpacket of a first data packet of the advanced interactive service, determining a state of transmission of the fragmented subpacket according to the access stratum context information during transmission of the fragmented subpacket to a user equipment on the DRB. The method also includes, when the transmission of the fragmented subpacket of the first data packet of the advanced interactive service to the user equipment has failed, stopping transmission of remaining fragmented subpackets of data packets associated with the first data packet to the user equipment.

20 Claims, 11 Drawing Sheets

(56)                    References Cited

U.S. PATENT DOCUMENTS

2020/0162919 A1 *   5/2020   Velev .................... H04W 60/00
2020/0314701 A1 *  10/2020   Talebi Fard .......... H04W 36/08

FOREIGN PATENT DOCUMENTS

WO          2015106444  A1     7/2015
WO      WO-2019159082  A1 *    8/2019     ........... H04W 76/22
WO          2020034844  A      2/2020
WO      WO-2022008086  A1 *    1/2022     ............. H04L 47/20

OTHER PUBLICATIONS

Zte, "Discussion on AMF initiated two GTP-U tunnel establishment," 3GPP TSG-RAN WG3 NR AdHoc 1807 R3-183668, Jun. 22, 2018, 9 pages.
1 Supplementary European Search Report issued Feb. 13, 2024 in Application No. 21913577.9, pp. 1-11.
Korean Office Action Received for Korean Application No. 10-2023-7010755 mailed on Jun. 20, 2025, 11 pages (6 pages of General Translation and 5 pages of Official Document).

* cited by examiner

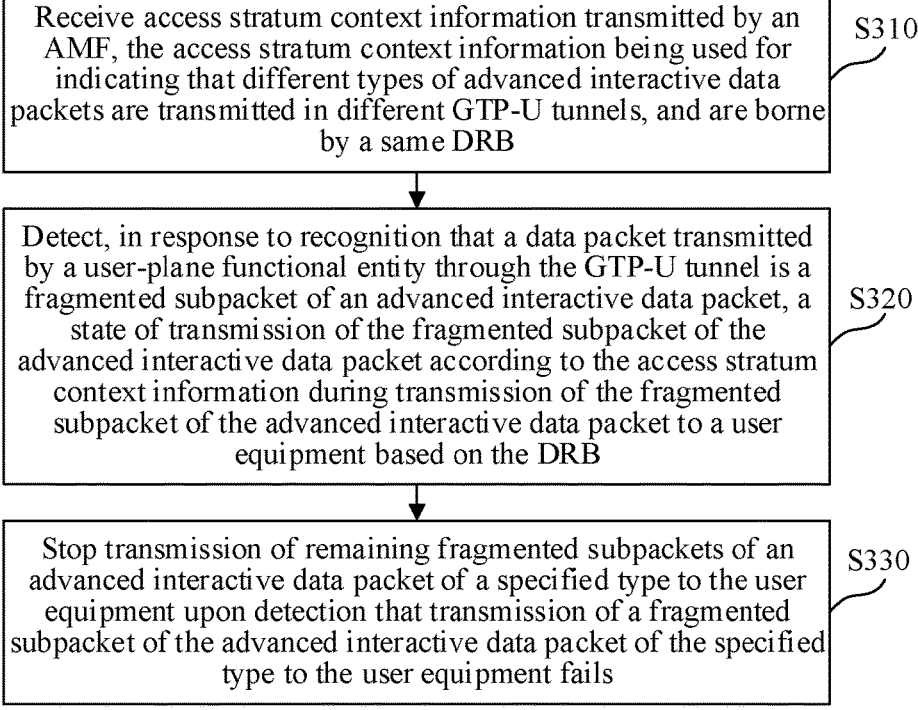

Receive access stratum context information transmitted by an AMF, the access stratum context information being used for indicating that different types of advanced interactive data packets are transmitted in different GTP-U tunnels, and are borne by a same DRB  S310

Detect, in response to recognition that a data packet transmitted by a user-plane functional entity through the GTP-U tunnel is a fragmented subpacket of an advanced interactive data packet, a state of transmission of the fragmented subpacket of the advanced interactive data packet according to the access stratum context information during transmission of the fragmented subpacket of the advanced interactive data packet to a user equipment based on the DRB  S320

Stop transmission of remaining fragmented subpackets of an advanced interactive data packet of a specified type to the user equipment upon detection that transmission of a fragmented subpacket of the advanced interactive data packet of the specified type to the user equipment fails  S330

FIG. 3

Mutiple types of advanced interactive data packets 4-1

| I-frame | P-frame | P-frame | I-frame | P-frame | P-frame | I-frame | P-frame | P-frame |

FIG. 4

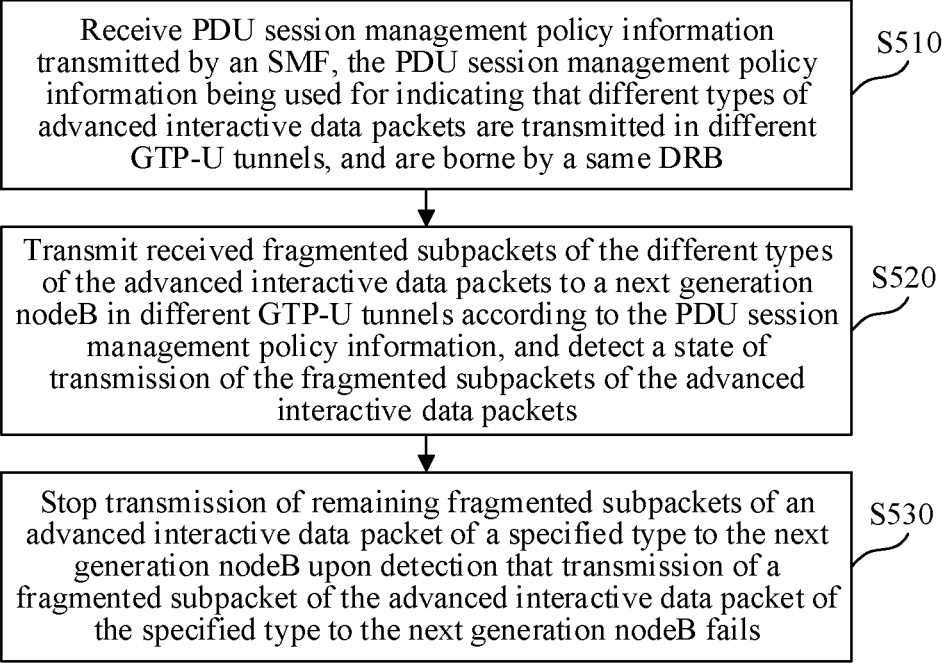

Receive PDU session management policy information transmitted by an SMF, the PDU session management policy information being used for indicating that different types of advanced interactive data packets are transmitted in different GTP-U tunnels, and are borne by a same DRB — S510

Transmit received fragmented subpackets of the different types of the advanced interactive data packets to a next generation nodeB in different GTP-U tunnels according to the PDU session management policy information, and detect a state of transmission of the fragmented subpackets of the advanced interactive data packets — S520

Stop transmission of remaining fragmented subpackets of an advanced interactive data packet of a specified type to the next generation nodeB upon detection that transmission of a fragmented subpacket of the advanced interactive data packet of the specified type to the next generation nodeB fails — S530

FIG. 5

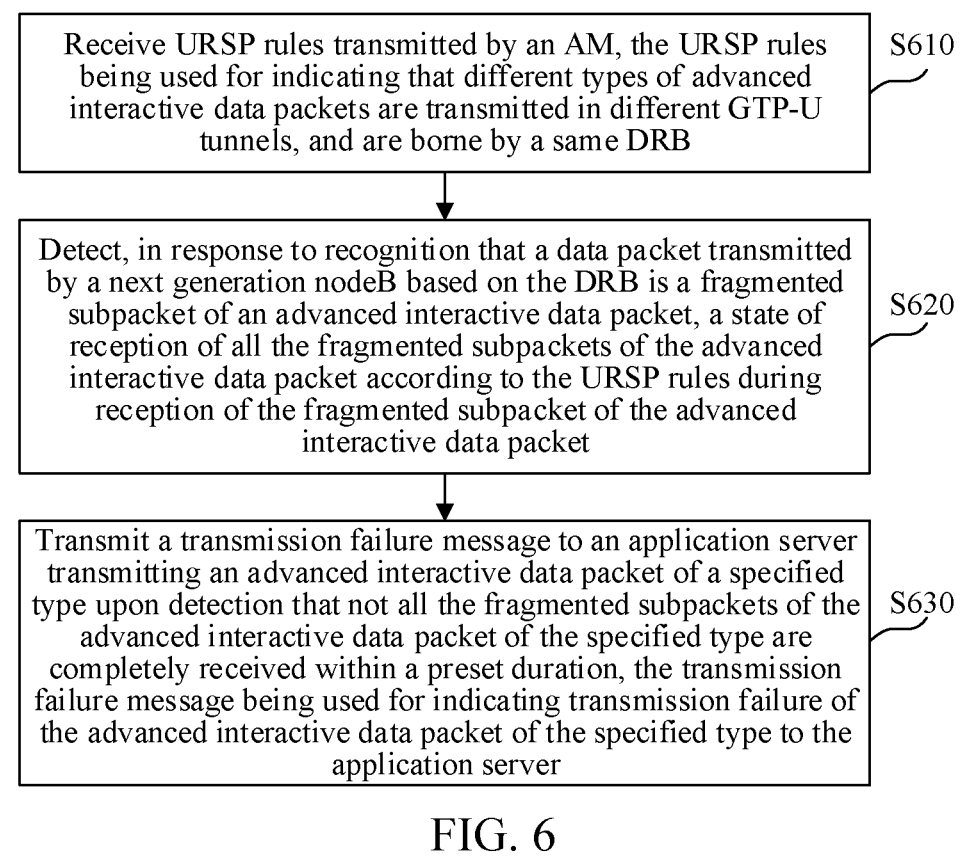

Receive URSP rules transmitted by an AM, the URSP rules being used for indicating that different types of advanced interactive data packets are transmitted in different GTP-U tunnels, and are borne by a same DRB — S610

Detect, in response to recognition that a data packet transmitted by a next generation nodeB based on the DRB is a fragmented subpacket of an advanced interactive data packet, a state of reception of all the fragmented subpackets of the advanced interactive data packet according to the URSP rules during reception of the fragmented subpacket of the advanced interactive data packet — S620

Transmit a transmission failure message to an application server transmitting an advanced interactive data packet of a specified type upon detection that not all the fragmented subpackets of the advanced interactive data packet of the specified type are completely received within a preset duration, the transmission failure message being used for indicating transmission failure of the advanced interactive data packet of the specified type to the application server — S630

FIG. 6

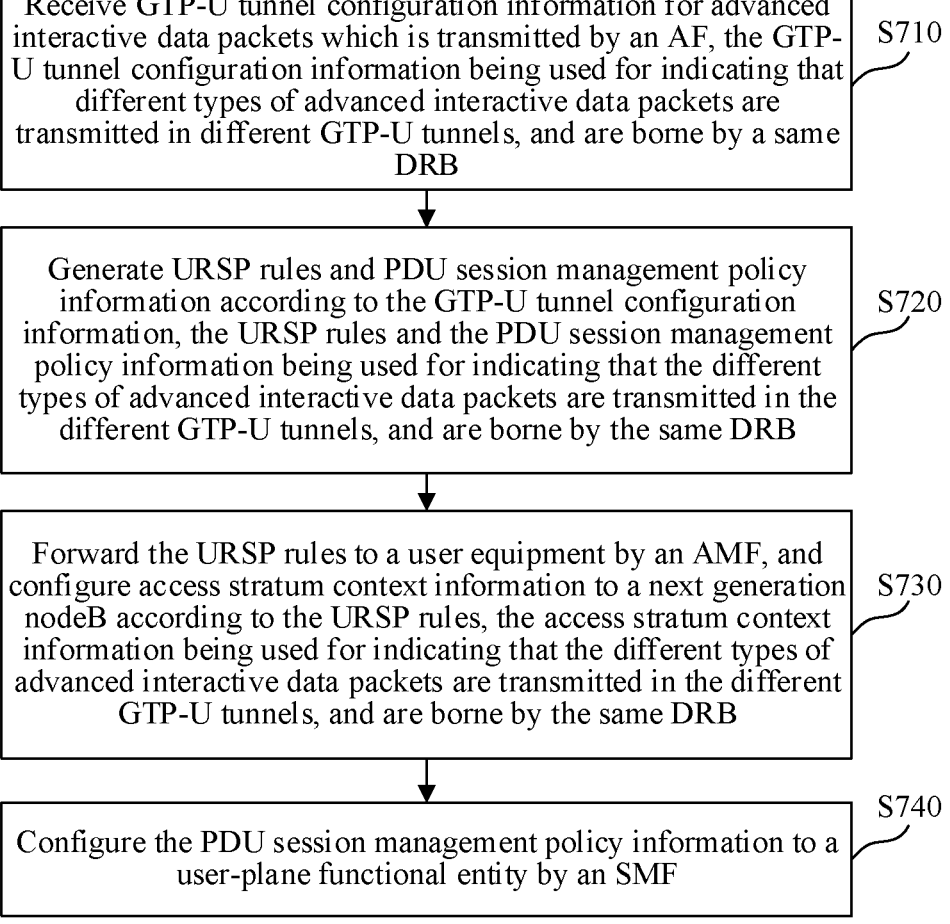

Receive GTP-U tunnel configuration information for advanced interactive data packets which is transmitted by an AF, the GTP-U tunnel configuration information being used for indicating that different types of advanced interactive data packets are transmitted in different GTP-U tunnels, and are borne by a same DRB     S710

Generate URSP rules and PDU session management policy information according to the GTP-U tunnel configuration information, the URSP rules and the PDU session management policy information being used for indicating that the different types of advanced interactive data packets are transmitted in the different GTP-U tunnels, and are borne by the same DRB     S720

Forward the URSP rules to a user equipment by an AMF, and configure access stratum context information to a next generation nodeB according to the URSP rules, the access stratum context information being used for indicating that the different types of advanced interactive data packets are transmitted in the different GTP-U tunnels, and are borne by the same DRB     S730

S740

Configure the PDU session management policy information to a user-plane functional entity by an SMF

Computer system 1700

MANAGING SUBPACKET TRANSMISSION AND RECEPTION FOR ADVANCED INTERACTIVE SERVICES

RELATED APPLICATIONS

This application is a continuation of International Application No. PCT/CN2021/131399, filed on Nov. 18, 2021, which claims priority to Chinese Patent Application No. 202110004590.5, filed on Jan. 4, 2021. The entire disclosures of the prior applications are hereby incorporated by reference.

FIELD OF THE TECHNOLOGY

This application relates to the technical fields of computers and communications, including a data transmission method and apparatus, a computer-readable storage medium, an electronic device, and a computer program product.

BACKGROUND OF THE DISCLOSURE

In the field of communications, for example, in 5th-Generation (5G) and evolved 5G systems, high-bandwidth advanced interactive services, such as cloud gaming, virtual reality (VR), augmented reality (AR), mixed reality (MR), extended reality (XR), and cinematic reality (CR), are an important type of services. These advanced interactive services have a high requirement on the timeliness of transmission, and with the improved resolution, frame rate and degree of freedom, data generated by the application layer increases greatly, which brings a great load to network transmission.

Generally, a data packet generated by the application layer of an advanced interactive service is usually cut into a large number of subpackets so as to be transmitted in fragments. However, in the process of transmitting the data packet of the advanced interactive service, if the transmission of one of the subpackets fails, the content of the entire data packet cannot be restored and presented in real time at the receiver, and thus the requirements for high bandwidth and low latency of advanced interactive services cannot be met.

SUMMARY

Embodiments of this disclosure provide a data transmission method and apparatus, a computer-readable storage medium, an electronic device, and a computer program product, which can reduce the time delay and consumption of resources in transmission of data packets.

In an embodiment, a data transmission method includes receiving access stratum context information transmitted by an access and mobility management function (AMF), the access stratum context information indicating that different types of data packets of an advanced interactive service are transmitted in different general packet radio service tunnel protocol user plane (GTP-U) tunnels, and are transmitted by a same data radio bearer (DRB). The method further includes, in response to a determination that a data packet transmitted by a user-plane functional entity through a GTP-U tunnel is a fragmented subpacket of a first data packet of the advanced interactive service, determining a state of transmission of the fragmented subpacket according to the access stratum context information during transmission of the fragmented subpacket to a user equipment on the DRB. The method further includes, in response to a determination that the transmission of the fragmented subpacket of the first data packet of the advanced interactive service to the user equipment has failed, stopping transmission of remaining fragmented subpackets of data packets associated with the first data packet to the user equipment.

In an embodiment, a data transmission apparatus includes processing circuitry configured to receive access stratum context information transmitted by an access and mobility management function (AMF), the access stratum context information indicating that different types of data packets of an advanced interactive service are transmitted in different general packet radio service tunnel protocol user plane (GTP-U) tunnels, and are transmitted by a same data radio bearer (DRB). The processing circuitry is further configured to, in response to a determination that a data packet transmitted by a user-plane functional entity through a GTP-U tunnel is a fragmented subpacket of a first data packet of the advanced interactive service, determine a state of transmission of the fragmented subpacket according to the access stratum context information during transmission of the fragmented subpacket to a user equipment on the DRB. The processing circuitry is further configured to, in response to a determination that the transmission of the fragmented subpacket of the first data packet of the advanced interactive service to the user equipment has failed, stop transmission of remaining fragmented subpackets of data packets associated with the first data packet to the user equipment.

In an embodiment, a non-transitory computer-readable storage medium stores computer-readable instructions thereon, which, when executed by processing circuitry, cause the processing circuitry to perform a data transmission method. The data transmission method includes receiving access stratum context information transmitted by an access and mobility management function (AMF), the access stratum context information indicating that different types of data packets of an advanced interactive service are transmitted in different general packet radio service tunnel protocol user plane (GTP-U) tunnels, and are transmitted by a same data radio bearer (DRB). The method further includes, in response to a determination that a data packet transmitted by a user-plane functional entity through a GTP-U tunnel is a fragmented subpacket of a first data packet of the advanced interactive service, determining a state of transmission of the fragmented subpacket according to the access stratum context information during transmission of the fragmented subpacket to a user equipment on the DRB. The method further includes, in response to a determination that the transmission of the fragmented subpacket of the first data packet of the advanced interactive service to the user equipment has failed, stopping transmission of remaining fragmented subpackets of data packets associated with the first data packet to the user equipment.

The embodiments of this disclosure have at least the following beneficial effects. An advanced interactive data packet (namely, a data packet of an advanced interactive service) is fragmented into subpackets, and the subpackets are classified, so that in a case that the transmission of a subpacket to the user equipment fails, the transmission of remaining fragmented subpackets of the advanced interactive data packet of a specified type to the user equipment can be stopped. That is, in the case that the transmission of a subpacket fails, the transmission of invalid subpackets can be stopped in time. Therefore, the time delay and consumption of resources of the transmission can be reduced.

BRIEF DESCRIPTION OF THE DRAWINGS

FIG. 3 shows a flowchart of a data transmission method according to an embodiment of this disclosure.

FIG. 4 shows a diagram illustrating a partition structure of an advanced interactive data packet according to an embodiment of this disclosure.

FIG. 5 shows a flowchart of another data transmission method according to an embodiment of this disclosure.

FIG. 6 shows a flowchart of yet another data transmission method according to an embodiment of this disclosure.

FIG. 7 shows a flowchart of still yet another data transmission method according to an embodiment of this disclosure.

DESCRIPTION OF EMBODIMENTS

"Plurality of" mentioned in the embodiments of this disclosure means two or more. The term and/or describes an association relationship for describing associated objects and represents that three association relationships may exist. For example, A and/or B may represent the following three association relationships: only A exists, both A and B exist, and only B exists. The character "/" generally indicates an "or" relationship between the associated objects.

The development in the field of communications (e.g. 4G (4th-Generation), 5G, etc.) promotes application of services requiring large data volume and short delay. Interactive services, such as cloud game services, VR, AR, MR, XR, and CR, may also be referred to as advanced interactive services (AIS), and in the embodiments of this disclosure, a data packet of an advanced interactive service is referred to as an advanced interactive data packet.

Figure 1:
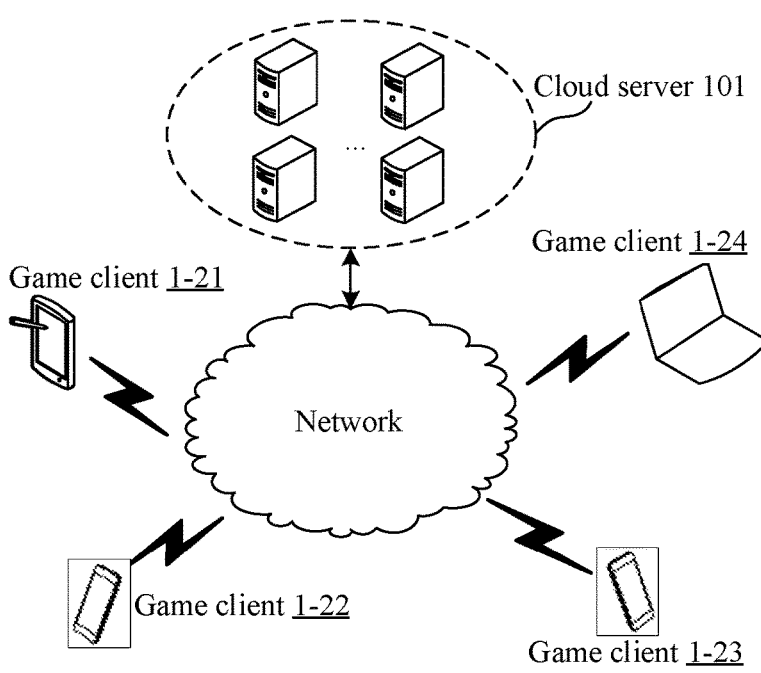
FIG. 1 shows a schematic diagram of an exemplary system architecture according to an embodiment of this disclosure.

For example, in a cloud gaming scenario shown in FIG. 1, a cloud server 101 is configured to run a cloud game. The cloud server 101 may render a game picture, encode an audio signal and a rendered image, and finally transmit the encoded data to various game clients (illustratively shown are a game client 1-21, a game client 1-22, a game client 1-23, and a game client 1-24) via a network. A game client may be a user equipment (UE) having basic streaming media playing, human-computer interaction and communication capabilities, for example, a smart phone, a tablet computer, a laptop computer, a desktop computer, an intelligent television, a set-top box, an intelligent vehicle-mounted device, a portable music player, a personal digital assistant, a dedicated message device, a portable game device, a smart speaker, etc. Alternatively, a game client may also be an application program running in a terminal device, for example, a native program or software module in the operating system, a native application (APP), i.e., a program (a game APP) which needs to be installed in the operating system to run; an applet, i.e., a program that only needs to be downloaded into the browser environment to run, and can be embedded in any APP.

In the embodiments of this disclosure, the game client may decode the encoded data transmitted by the cloud server 101 to obtain analogue audio and video signals to play. It is to be understood that FIG. 1 is merely an exemplary system architecture for characterizing a cloud gaming system and does not limit the specific architecture of the cloud gaming system. For example, a backend server for scheduling may also be included in the cloud gaming system, and so on. In addition, the cloud server 101 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The game client and the cloud server 101 may be directly or indirectly connected in a wired or wireless communication manner. This is not limited in this disclosure.

Figure 2:
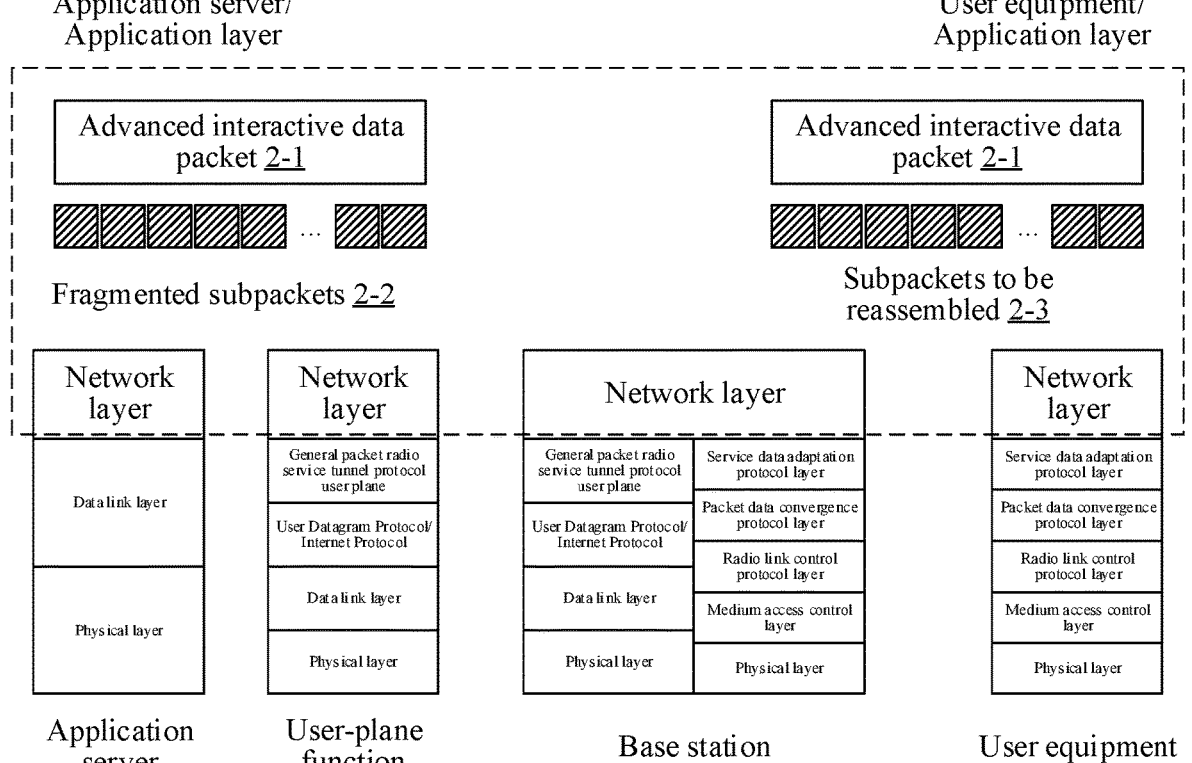
FIG. 2 shows a schematic diagram illustrating the transmission process of an advanced interactive data packet according to an embodiment of this disclosure.

In the application scenario of various advanced interactive services, the large advanced interactive data packet needs to be fragmented into multiple subpackets for transmission. That is, as shown in FIG. 2, for example, in a 5G system, the user plane mainly includes an application server, a user plane function (UPF), a next generation nodeB (gNB), and a user equipment. In some service scenarios, the advanced interactive data packet is mainly transmitted in the downlink direction, for example, from the application server to the UPF, and then transmitted to the UE via the gNB. When transmitted, the advanced interactive data packet 2-1 is fragmented at the application layer of the application server. The fragmented subpackets 2-2 arrive at the UPF as Internet protocol (IP) packets from the application server, and then transmitted by the 5G system to the UE via a PDU session. Then, at the application layer of the UE, the subpackets are submitted upward layer-by-layer in the protocol stack and reassembled (the subpackets 2-3 to be reassembled are shown in the figure) to restore the advanced interactive data packet 2-1.

In the system shown in FIG. 2, the application server includes an L1 layer, an L2 layer, and an IP layer; the user plane function includes an L1 layer, an L2 layer, the user datagram protocol (UDP)/IP, a general packet radio service tunnel protocol user plane, and an IP layer; the next generation nodeB includes an L1 layer, an L2 layer, UDP/IP, GTP-U, a physical (PHY) layer, a medium access control (MAC) layer, a radio link control (RLC) protocol layer, a packet data convergence protocol (PDCP) layer, a service data adaptation protocol (SDAP) layer, and an IP layer; the user equipment includes a PHY layer, a MAC layer, a RLC layer, a PDCH layer, a SDAP layer, and an IP layer. Among others, the L1 layer refers to the physical layer for ensuring that original data can be transmitted via various physical media; the L2 layer refers to the data link layer that provides services to the network layer on the basis of services provided by the physical layer; the IP layer is the network layer for data transmission between two end systems.

In application scenarios of various advanced interactive services, an advanced interactive data packet generated by the application layer needs to be fragmented into a large number of subpackets and transmitted with a very low delay. Once the transmission of one of the subpackets does not meet the transmission requirements, the entire advanced interactive data packet cannot be restored and presented in real time at the receiver, and thus cannot meet the requirements of advanced interactive high-bandwidth services. In this case, the transmission of a large number of fragmented subpackets actually wastes network resources. For example, if an advanced interactive data packet is fragmented into 10 subpackets (or even more subpackets), and the probability of successful transmission of each subpacket is 0.99, then the probability of successful transmission of all the 10 subpackets is $0.99^{10}$, i.e., 0.904. Therefore, for an advanced interactive data packet fragmented into multiple subpackets, even if the probability of success transmission of each subpacket is very high, the probability of success transmission of all the fragmented subpackets of the entire advanced interactive data packet will be greatly reduced. In addition, if the transmission of a subpacket fails, the receiver cannot restore the advanced interactive data packet, and in this case, it is meaningless to go on transmitting the fragmented subpackets of the advanced interactive data packet. On this basis, embodiments of this disclosure provide a data transmission method and apparatus, a computer-readable storage medium, an electronic device, and a computer program product, which can reduce the time delay and consumption of resources in transmission of data packets.

In an embodiment, a non-transitory computer-readable storage medium stores computer-readable instructions which, when executed by a computer device, cause the computer device to perform a data transmission method that includes receiving access stratum context information transmitted by an access and mobility management function (AMF), the access stratum context information indicating that different types of data packets of an advanced interactive service are transmitted in different general packet radio service tunnel protocol user plane (GTP-U) tunnels, and are transmitted by a same data radio bearer (DRB). The method further includes, in response to a determination that a data packet transmitted by a user-plane functional entity through a GTP-U tunnel is a fragmented subpacket of a first data packet of the advanced interactive service, determining a state of transmission of the fragmented subpacket according to the access stratum context information during transmission of the fragmented subpacket to a user equipment on the DRB. The method further includes, in response to a determination that the transmission of the fragmented subpacket of the first data packet of the advanced interactive service to the user equipment has failed, stopping transmission of remaining fragmented subpackets of data packets associated with the first data packet to the user equipment.

In an embodiment, a non-transitory computer-readable storage medium stores computer-readable instructions which, when executed by a computer device, cause the computer device to perform a data transmission method that includes receiving protocol data unit (PDU) session management policy information transmitted by a session management function (SMF). The PDU session management policy information indicates that different types of data packets of an advanced interactive service are transmitted in different general packet radio service tunnel protocol user plane (GTP-U) tunnels, and are transmitted by a same data radio bearer (DRB). The method further includes transmitting received fragmented subpackets of the different types of data packets of the advanced interactive service to a next generation nodeB in the different GTP-U tunnels according to the PDU session management policy information, and detecting a state of transmission of the fragmented subpackets. The method further includes, in response to a determination that transmission of a fragmented subpacket of a first data packet of the advanced interactive service to the next generation nodeB has failed, stopping transmission of remaining fragmented subpackets of data packets associated with the first data packet to the next generation nodeB.

In an embodiment, a non-transitory computer-readable storage medium stores computer-readable instructions which, when executed by a computer device, cause the computer device to perform a data transmission method that includes receiving user equipment route selection policy (URSP) rules transmitted by an access and mobility management function (AMF). The URSP rules indicate that different types of data packets of an advanced interactive service are transmitted in different general packet radio service tunnel protocol user plane (GTP-U) tunnels, and are transmitted by a same data radio bearer (DRB). The method further includes, in response to a determination that a data packet transmitted by a next generation nodeB on the DRB is a fragmented subpacket of a first data packet of the advanced interactive service, determining a state of reception of all fragmented subpackets of the first data packet according to the URSP rules during reception of the fragmented subpacket of the first data packet. The method further includes, in response to a determination that not all of the fragmented subpackets of the first data packet of the advanced interactive service are received within a preset duration, transmitting a transmission failure message to an application server transmitting data packets associated with the first data packet, the transmission failure message indicating transmission failure of the first data packet to the application server.

FIG. 3 shows a flowchart of a data transmission method that may be performed by a next generation nodeB according to an embodiment of this disclosure. Referring to FIG. 3, the data transmission method includes at least S310 to S330, each of which will be described below.

In S310, access stratum context information transmitted by an AMF is received, the access stratum context information being used for indicating that different types of advanced interactive data packets are transmitted in different GTP-U tunnels, and are borne by a same DRB. For example, the access stratum context information indicating that different types of data packets of an advanced interactive service are transmitted in different general packet radio service tunnel protocol user plane (GTP-U) tunnels, and are transmitted by a same data radio bearer (DRB).

In a case that the next generation nodeB is divided into a control plane and a user plane, namely, the next generation nodeB is divided into a gNB centralized unit (gNB-CU) and a next generation nodeB distributed unit (gNB Distributed Unit, gNB-DU), with the gNB-CU serving as the control plane and the gNB-DU serving as the user plane, then the next generation nodeB in this embodiment of this disclosure may be the gNB-DU.

In an embodiment of this disclosure, the type of the advanced interactive data packet may be determined according to the type priority, etc., of the content of the service to be transmitted. For example, the types of the advanced interactive data packets may include key frames and non-key frames, where the key frame may be an intra picture frame (I-frame), and the non-key frame may be a predictive frame (P-frame) and/or a bi-directional interpolated prediction frame (B-frame).

In an embodiment of this disclosure, multiple types of advanced interactive data packets may be transmitted in different GTP-U tunnels as follows: one type of advanced interactive data packet is transmitted in one GTP-U tunnel, and different types of advanced interactive data packets are transmitted using different GTP-U tunnels.

In S320, in response to recognition that a data packet transmitted by a user-plane functional entity through the GTP-U tunnel is a fragmented subpacket of an advanced interactive data packet, a state of transmission of the fragmented subpacket of the advanced interactive data packet is detected according to the access stratum context information during transmission of the fragmented subpacket of the advanced interactive data packet to a user equipment based on the DRB. For example, in response to a determination that a data packet transmitted by a user-plane functional entity through a GTP-U tunnel is a fragmented subpacket of a first data packet of the advanced interactive service, a state of transmission of the fragmented subpacket is determined according to the access stratum context information during transmission of the fragmented subpacket to a user equipment on the DRB.

In an embodiment of this disclosure, the user-plane functional entity transmits different types of advanced interactive data packets in different GTP-U tunnels, namely, the GTP-U tunnels used for transmitting different types of advanced interactive data packets are different. The next generation nodeB may receive the data packet transmitted by the user-plane functional entity in different GTP-U tunnels, and after receiving the data packet, may also recognize whether the data packet is a fragmented subpacket of an advanced interactive data packet. Alternatively, the next generation nodeB may also identify the type of the advanced interactive data packet according to the GTP-U tunnel in which the fragmented subpacket of the advanced interactive data packet is received. For example, the identification information of the GTP-U tunnel may be associated with the type of the advanced interactive data packet, and then the type of the received advanced interactive data packet may be determined according to the identification information of the GTP-U tunnel in which the fragmented subpacket of the advanced interactive data packet is received.

In an embodiment of this disclosure, assuming that there are two types of advanced interactive data packets, i.e., the advanced interactive data packets corresponding to key frames and the advanced interactive data packets corresponding to non-key frames, then the user-plane functional entity may transmit the two types of advanced interactive data packets in two GTP-U tunnels, which may be the case that the fragmented subpackets of the advanced interactive data packets corresponding to key frames are transmitted in one GTP-U tunnel, and the fragmented subpackets of the advanced interactive data packets corresponding to non-key frames are transmitted in the other GTP-U tunnel.

In an embodiment of this disclosure, a plurality of sub-packets are created by fragmentation of the advanced interactive data packet, including a start data packet and an end data packet. The start data packet includes first indication information for indicating that the start data packet is the first subpacket to be transmitted in the plurality of subpackets; the end data packet includes second indication information for indicating that the end data packet is the last subpacket to be transmitted in the plurality of subpackets.

In an embodiment of this disclosure, the next generation nodeB determines whether a fragmented subpacket of an advanced interactive data packet is received by recognizing the start data packet and the end data packet. For example, if the next generation nodeB recognizes the start data packet according to the first indication information contained in the start data packet, then the data packets received between the start data packet and the end data packet are all fragmented subpackets of an advanced interactive data packet.

In an embodiment of this disclosure, the next generation nodeB may recognize whether a received data packet is a fragmented subpacket of an advanced interactive data packet according to indication information contained in a protocol field of the received data packet.

A start data packet in a plurality of fragmented subpackets of an advanced interactive data packet is added in the protocol field with indication information for indicating that it is a start data packet, and an end data packet is added in the protocol field with indication information for indicating that it is an end data packet. Then, after the next generation nodeB recognizes the start data packet according to the protocol field of the data packet, the data packets received between the start data packet and the end data packet are all fragmented subpackets of the advanced interactive data packet.

In an embodiment of this disclosure, the next generation nodeB may recognize whether a received data packet is a fragmented subpacket of an advanced interactive data packet according to indication information contained in payload information of the received data packet.

For example, a start data packet in a plurality of fragmented subpackets of an advanced interactive data packet is added in the payload information with indication information for indicating that it is a start data packet, and an end data packet is added in the payload information with indication information for indicating that it is an end data packet. Then, after the start data packet is recognized according to the payload information of the data packet, the data packets between the start data packet and the end data packet are all fragmented subpackets of the advanced interactive data packet.

Still referring to FIG. 3, in S330, transmission of remaining fragmented subpackets of an advanced interactive data packet of a specified type to the user equipment is stopped upon detection that transmission of a fragmented subpacket of the advanced interactive data packet of the specified type to the user equipment fails. For example, in response to a determination that the transmission of the fragmented subpacket of the first data packet of the advanced interactive service to the user equipment has failed, transmission of remaining fragmented subpackets of data packets associated with the first data packet to the user equipment is stopped.

In an embodiment of this disclosure, if the next generation nodeB detects that a fragmented subpacket of an advanced interactive data packet of a specified type is a subpacket that fails to be transmitted to the user equipment, then the advanced interactive data packet of the specified type cannot be restored even if the transmission of the remaining fragmented subpackets of the advanced interactive data packet of the specified type are transmitted. Therefore, the next generation nodeB may stop transmitting the remaining sub-packets to the user equipment so as to reduce the occupation of bandwidth, which is beneficial to reduce the occupation of transmission resources by the advanced interactive data packet during transmission.

In an embodiment of this disclosure, if a fragmented subpacket of an advanced interactive data packet is a sub-packet that fails to be transmitted to the user equipment, then the advanced interactive data packet is an advanced inter-active data packet of a specified type. In other words, the advanced interactive data packet of the specified type is an advanced interactive data packet having a subpacket that fails to be transmitted. The specified type is any one of a plurality of types.

In an embodiment of this disclosure, the different types of advanced interactive data packets include two types of advanced interactive data packets, and the two types of advanced interactive data packets are advanced interactive data packets corresponding to key frames and advanced interactive data packet corresponding to non-key frames. If an advanced interactive data packet corresponding to a non-key frame being transmitted has a subpacket that fails to be transmitted, the advanced interactive data packet corre-sponding to the non-key frame is an advanced interactive data packet of the specified type; if an advanced interactive data packet corresponding to a key frame being transmitted has a subpacket that fails to be transmitted, the advanced interactive data packet corresponding to the key frame is an advanced interactive data packet of the specified type.

In an embodiment of this disclosure, in detection of whether a fragmented subpacket of an advanced interactive data packet is a subpacket that fails to be transmitted to the user equipment, the next generation nodeB may individually detect fragmented subpackets of multiple types of advanced interactive data packets, and the detections for the frag-mented subpackets of multiple types of advanced interactive data packets do not affect each other. At the same time, the transmissions of the fragmented subpackets of multiple types of advanced interactive data packets may also do not affect each other. For example, if the transmission of a fragmented subpacket of an advanced interactive data packet of a certain type to the user equipment fails, the transmission of the remaining fragmented subpackets of the advanced interactive data packet of the specified type to the user equipment may be stopped, but this process does not affect the transmission of fragmented subpackets of advanced interactive data packets of other types, that is to say, the transmission of fragmented subpackets of advanced inter-active data packets of other types may continue.

In an embodiment of this disclosure, if the next generation nodeB detects that transmission of a fragmented subpacket of an advanced interactive data packet of a specified type to the user equipment fails, then received fragmented subpack-ets of the advanced interactive data packet of the specified type may be discarded, so as to reduce the occupation of storage resources.

In an embodiment of this disclosure, if the next generation nodeB detects that transmission of a fragmented subpacket of an advanced interactive data packet of a specified type to the user equipment fails, a first feedback message may be transmitted to a user-plane functional entity, the first feed-back message being used for instructing the user-plane functional entity to stop transmission of remaining frag-mented subpackets of the advanced interactive data packet of the specified type.

It is to be understood that when the next generation nodeB detects that there is a subpacket that fails to be transmitted in the process of transmitting an advanced interactive data packet of a specified type to the user equipment, the next generation nodeB may transmit a first feedback message to the user-plane functional entity so as to instruct the user-plane functional entity to stop transmitting the remaining fragmented subpackets of the advanced interactive data packet of the specified type, so as to reduce the occupation of transmission resources.

In an embodiment of this disclosure, the next generation nodeB transmits the first feedback message to the user-plane functional entity under a condition that not all the frag-mented subpackets of the advanced interactive data packet of the specified type are completely received; if all the fragmented subpackets of the advanced interactive data packet of the specified type have been completely received, then there is no need to transmit the first feedback message to the user-plane functional entity.

In an embodiment of this disclosure, if the next generation nodeB does not completely receive all the fragmented subpackets of the advanced interactive data packet of the specified type transmitted by the user-plane functional entity within a preset duration, the next generation nodeB stops transmission of remaining fragmented subpackets of the advanced interactive data packet of the specified type to the user equipment, and discards received fragmented subpack-ets of the advanced interactive data packet of the specified type.

The advanced interactive data packet may be a data packet with a time limit. If the next generation nodeB does not completely receive all the fragmented subpackets of the advanced interactive data packet of the specified type trans-mitted by the user-plane functional entity within a preset duration, it indicates that the advanced interactive data packet of the specified type has exceeded the time limit, and then the next generation nodeB no longer needs to transmit the remaining fragmented subpackets of the advanced inter-active data packet of the specified type to the user equip-ment. Of course, if not all the fragmented subpackets of the advanced interactive data packet of the specified type trans-mitted by the user-plane functional entity are completely received within a preset duration, it is also possible that the user-plane functional entity detects a subpacket transmission error and then stops the transmission, then it is also indicated that the next generation nodeB no longer needs to transmit the remaining fragmented subpackets of the advanced inter-active data packet of the specified type to the user equip-ment. In this case, the transmission of the remaining frag-mented subpackets of the advanced interactive data packet of the specified type to the user equipment may be stopped, and the received fragmented subpackets of the advanced interactive data packet of the specified type may be dis-carded.

In an embodiment of this disclosure, as shown in FIG. 4, multiple types of advanced interactive data packets 4-1 may include: advanced interactive data packets corresponding to key frames (I-frames shown in FIG. 4) and advanced inter-active data packets corresponding to non-key frames (P-frames shown in FIG. 4).

As the restoration of non-key frames relies on key frames, if the next generation nodeB detects that the transmission of a fragmented subpacket of an advanced interactive data packet corresponding to a key frame to the user equipment fails, the next generation nodeB stops transmission of an advanced interactive data packet corresponding to a non-key frame associated with the key frame to the user equipment, and/or discards a received advanced interactive data packet corresponding to a non-key frame associated with the key frame.

It is to be understood that when the transmission of a fragmented subpacket of an advanced interactive data packet corresponding to a key frame fails, the next generation nodeB not only stops transmission of remaining fragmented subpackets of the advanced interactive data packet corresponding to the key frame, but also stops transmission of an advanced interactive data packet corresponding to a non-key frame associated with the specified key frame. That is to say, the next generation nodeB stops the transmission of the remaining fragmented subpackets of the advanced interactive data packet corresponding to the non-key frame associated with the key frame. In this way, the bandwidth occupation of invalid subpackets can be reduced, which is beneficial to reduce the occupation of transmission resources by the advanced interactive data packet during transmission.

FIG. 3 illustrates the data transmission method of an embodiment of this disclosure from the perspective of the next generation nodeB. A data transmission method of an embodiment of this disclosure is described below from the perspective of a user-plane functional entity.

FIG. 5 shows a flowchart of another data transmission method that may be performed by a user-plane functional entity according to an embodiment of this disclosure. Referring to FIG. 5, the data transmission method includes at least S510 to S530, each of which will be described below.

In S510, PDU session management policy information transmitted by an SMF is received, the PDU session management policy information being used for indicating that different types of advanced interactive data packets are transmitted in different GTP-U tunnels, and are borne by a same DRB. For example, the PDU session management policy information indicates that different types of data packets of an advanced interactive service are transmitted in different general packet radio service tunnel protocol user plane (GTP-U) tunnels, and are transmitted by a same data radio bearer (DRB).

In an embodiment of this disclosure, the type of the advanced interactive data packet may be determined according to the type priority, etc., of the content of the service to be transmitted. For example, the types of the advanced interactive data packets may include key frames and non-key frames, where the key frame may be an I-frame, and the non-key frame may be a P-frame and/or a B-frame.

In S520, received fragmented subpackets of the different types of the advanced interactive data packets are transmitted to a next generation nodeB in different GTP-U tunnels according to the PDU session management policy information, and a state of transmission of the fragmented subpackets of the advanced interactive data packets is detected. For example, received fragmented subpackets of the different types of data packets of the advanced interactive service are transmitted to a next generation nodeB in the different GTP-U tunnels according to the PDU session management policy information, and a state of transmission of the fragmented subpackets is detected.

In an embodiment of this disclosure, a plurality of subpackets are created by fragmentation of the advanced interactive data packet, including a start data packet and an end data packet. The start data packet includes first indication information for indicating that the start data packet is the first subpacket to be transmitted in the plurality of subpackets; the end data packet includes second indication information for indicating that the end data packet is the last subpacket to be transmitted in the plurality of subpackets.

It is to be understood that the user-plane functional entity determines whether a fragmented subpacket of an advanced interactive data packet is received by recognizing the start data packet and the end data packet. For example, if the user-plane functional entity recognizes the start data packet according to the first indication information contained in the start data packet, then the data packets between the start data packet and the end data packet are all fragmented subpackets of an advanced interactive data packet.

In an embodiment of this disclosure, the user-plane functional entity may recognize whether a received data packet is a fragmented subpacket of an advanced interactive data packet according to indication information contained in a protocol field of the received data packet.

A start data packet in a plurality of fragmented subpackets of an advanced interactive data packet is added in the protocol field with indication information for indicating that it is a start data packet, and an end data packet is added in the protocol field with indication information for indicating that it is an end data packet. Then, after the user-plane functional entity recognizes the start data packet according to the protocol field of the data packet, the data packets received between the start data packet and the end data packet are all fragmented subpackets of the advanced interactive data packet.

In an embodiment of this disclosure, the user-plane functional entity may recognize whether a received data packet is a fragmented subpacket of an advanced interactive data packet according to indication information contained in payload information of the received data packet.

For example, a start data packet in a plurality of fragmented subpackets of an advanced interactive data packet is added in the payload information with indication information for indicating that it is a start data packet, and an end data packet is added in the payload information with indication information for indicating that it is an end data packet. Then, after the start data packet is recognized according to the payload information of the data packet, the data packets received between the start data packet and the end data packet are all fragmented subpackets of the advanced interactive data packet.

In S530, transmission of remaining fragmented subpackets of an advanced interactive data packet of a specified type to the next generation nodeB is stopped upon detection that transmission of a fragmented subpacket of the advanced interactive data packet of the specified type to the next generation nodeB fails. For example, in response to a determination that transmission of a fragmented subpacket of a first data packet of the advanced interactive service to the next generation nodeB has failed, transmission of remaining fragmented subpackets of data packets associated with the first data packet to the next generation nodeB is stopped.

In an embodiment of this disclosure, if the user-plane functional entity detects that a fragmented subpacket of an advanced interactive data packet of a specified type is a subpacket that fails to be transmitted to the next generation nodeB, then it is meaningless to go on transmitting the remaining fragmented subpackets of the advanced interactive data packet of the specified type. Therefore, the user-plane functional entity may stop transmitting the remaining subpackets to the next generation nodeB so as to reduce the occupation of bandwidth, which is beneficial to reduce the occupation of transmission resources by the advanced interactive data packet during transmission.

In an embodiment of this disclosure, if the user-plane functional entity detects that a fragmented subpacket of an advanced interactive data packet of a specified type is a subpacket that fails to be transmitted to the next generation nodeB, then received fragmented subpackets of the advanced interactive data packet of the specified type may be discarded, so as to reduce the occupation of storage resources.

In an embodiment of this disclosure, if the user-plane functional entity detects that a fragmented subpacket of an advanced interactive data packet of a specified type is a subpacket that fails to be transmitted to the next generation nodeB, a second feedback message may be transmitted to an application server, the second feedback message being used for instructing the application server to stop transmission of remaining fragmented subpackets of the advanced interactive data packet to the application server.

It is to be understood that when the user-plane functional entity detects that there is a subpacket that fails to be transmitted in the process of transmitting an advanced interactive data packet of a specified type to the next generation nodeB, the user-plane functional entity may transmit a second feedback message to the application server so as to instruct the application server to stop transmitting the remaining fragmented subpackets, so as to reduce the occupation of transmission resources.

In an embodiment of this disclosure, the user-plane functional entity transmits the second feedback message to the application server under a condition that not all the fragmented subpackets of the advanced interactive data packet of the specified type are completely received; if all the fragmented subpackets of the advanced interactive data packet of the specified type have been completely received, then there is no need to transmit the second feedback message to the application server.

In an embodiment of this disclosure, if the user-plane functional entity does not completely receive all the fragmented subpackets of the advanced interactive data packet of the specified type transmitted by the application server within a preset duration, the next generation nodeB stops transmission of remaining fragmented subpackets of the advanced interactive data packet of the specified type to the next generation nodeB, and discards received fragmented subpackets of the advanced interactive data packet of the specified type.

The advanced interactive data packet may be a data packet with a time limit. If the user-plane functional entity does not completely receive all the fragmented subpackets of the advanced interactive data packet of the specified type transmitted by the application server within the preset duration, it indicates that the advanced interactive data packet has exceeded the time limit, and then the user-plane functional entity no longer needs to transmit the remaining fragmented subpackets to the next generation nodeB. Of course, if the user-plane functional entity does not receive all the fragmented subpackets of the advanced interactive data packet of the specified type transmitted by the application server within a preset duration, it is also possible that the application server detects a subpacket transmission error and then stops the transmission, then it is also indicated that the user-plane functional entity no longer needs to transmit the remaining fragmented subpackets to the next generation nodeB. In this case, the user-plane functional entity may also stop transmission of the remaining fragmented subpackets of the advanced interactive data packet of the specified type to the next generation nodeB, and discard the received fragmented subpackets of the advanced interactive data packet of the specified type.

In an embodiment of this disclosure, if the different types of advanced interactive data packets include advanced interactive data packets corresponding to key frames and advanced interactive data packets corresponding to non-key frames, as the restoration of non-key frames relies on key frames, if it is detected that a fragmented subpacket of an advanced interactive data packet corresponding to a specified key frame is a subpacket that fails to be transmitted to the next generation nodeB, the transmission of an advanced interactive data packet corresponding to a non-key frame associated with the key frame to the next generation nodeB may be stopped, and/or a received advanced interactive data packet corresponding to a non-key frame associated with the key frame may be discarded.

It is to be understood that when there is a fragmented subpacket that fails to be transmitted in a plurality of fragmented subpackets of an advanced interactive data packet corresponding to a key frame, not only the transmission of remaining fragmented subpackets of the advanced interactive data packet corresponding to the specified key frame is stopped, but also the transmission of an advanced interactive data packet corresponding to a non-key frame associated with the specified key frame is stopped. That is to say, the transmission of the remaining fragmented subpackets of the advanced interactive data packet corresponding to the associated non-key frame is stopped. In this way, the bandwidth occupation of invalid data packets can be reduced, which is beneficial to reduce the occupation of transmission resources by the advanced interactive data packet during transmission.

A data transmission method of an embodiment of this disclosure is described below from the perspective of a user equipment.

FIG. 6 shows a flowchart of yet another data transmission method that may be performed by a user equipment according to an embodiment of this disclosure. Referring to FIG. 6, the data transmission method includes at least S610 to S630, each of which will be described below.

In S610, URSP rules transmitted by an AMF are received, the URSP rules being used for indicating that different types of advanced interactive data packets are transmitted in different GTP-U tunnels, and are borne by a same DRB. For example, the URSP rules indicate that different types of data packets of an advanced interactive service are transmitted in different general packet radio service tunnel protocol user plane (GTP-U) tunnels, and are transmitted by a same data radio bearer (DRB).

In S620, in response to recognition that a data packet transmitted by a next generation nodeB based on the DRB is a fragmented subpacket of an advanced interactive data packet, a state of reception of all the fragmented subpacket of the advanced interactive data packet is detected according to the URSP rules during reception of the fragmented subpacket of the advanced interactive data packet. For example, in response to a determination that a data packet transmitted by a next generation nodeB on the DRB is a fragmented subpacket of a first data packet of the advanced interactive service, a state of reception of all fragmented subpackets of the first data packet is determined according to the URSP rules during reception of the fragmented subpacket of the first data packet.

In an embodiment of this disclosure, a plurality of subpackets are created by fragmentation of the advanced interactive data packet, including a start data packet and an end data packet. The start data packet includes first indication information for indicating that the start data packet is the first subpacket to be transmitted in the plurality of subpackets; the end data packet includes second indication information for indicating that the end data packet is the last subpacket to be transmitted in the plurality of subpackets.

It is to be understood that the user equipment determines whether a fragmented subpacket of an advanced interactive data packet is received by recognizing the start data packet and the end data packet. For example, if the user equipment recognizes the start data packet according to the first indication information contained in the start data packet, then the data packets between the start data packet and the end data packet are all fragmented subpackets of an advanced interactive data packet.

In an embodiment of this disclosure, the user equipment may recognize whether a received data packet is a fragmented subpacket of an advanced interactive data packet according to indication information contained in a protocol field of the received data packet.

A start data packet in a plurality of fragmented subpackets of an advanced interactive data packet is added in the protocol field with indication information for indicating that it is a start data packet, and an end data packet is added in the protocol field with indication information for indicating that it is an end data packet. Then, after the user equipment recognizes the start data packet according to the protocol field of the data packet, the data packets received between the start data packet and the end data packet are all fragmented subpackets of the advanced interactive data packet.

In an embodiment of this disclosure, the user equipment may recognize whether a received data packet is a fragmented subpacket of an advanced interactive data packet according to indication information contained in payload information of the received data packet.

For example, a start data packet in a plurality of fragmented subpackets of an advanced interactive data packet is added in the payload information with indication information for indicating that it is a start data packet, and an end data packet is added in the payload information with indication information for indicating that it is an end data packet. Then, after the start data packet is recognized according to the payload information of the data packet, the data packets received between the start data packet and the end data packet are all fragmented subpackets of the advanced interactive data packet.

In S630, a transmission failure message is transmitted to an application server transmitting an advanced interactive data packet of a specified type upon detection that not all the fragmented subpackets of the advanced interactive data packet of the specified type are completely received within a preset duration, the transmission failure message being used for indicating transmission failure of the advanced interactive data packet of the specified type to the application server. For example, in response to a determination that not all of the fragmented subpackets of the first data packet of the advanced interactive service are received within a preset duration, a transmission failure message is transmitted to an application server transmitting data packets associated with the first data packet, the transmission failure message indicating transmission failure of the first data packet to the application server.

In an embodiment of this disclosure, when performing integration processing on all the fragmented subpackets of the advanced interactive data packet of the specified type, the user equipment may perform the integration processing according to the order of the subpackets, and finally obtain a complete advanced interactive data packet.

In this embodiment of this disclosure, if the user equipment does not completely receive all the fragmented subpackets of the advanced interactive data packet of the specified type within a preset duration, the received fragmented subpackets of the advanced interactive data packet of the specified type may be discarded.

The advanced interactive data packet may be a data packet with a time limit. If the user equipment does not completely receive all the fragmented subpackets of the advanced interactive data packet of the specified type within the preset duration, it indicates that the advanced interactive data packet of the specified type has exceeded the time limit, and then the user equipment no longer needs to receive the remaining fragmented subpackets of the advanced interactive data packet of the specified type and perform the integration processing. Therefore, the user equipment may discard the received fragmented subpackets of the advanced interactive data packet of the specified type. Of course, if not all the fragmented subpackets of the advanced interactive data packet of the specified type are completely received within the preset duration, it is also possible that the next generation nodeB detects a subpacket transmission error and then stops the transmission, and then the user-plane functional entity may discard the received fragmented subpackets of the advanced interactive data packet of the specified type.

In an embodiment of this disclosure, if the user equipment does not completely receive all the fragmented subpackets of the advanced interactive data packet of the specified type within a preset duration, a transmission failure message is transmitted to an application server transmitting the advanced interactive data packet of the specified type for indicating transmission failure of the advanced interactive data packet.

It is to be understood that the technical solution of this embodiment allows the user equipment to transmit a transmission failure message to the application server upon detection that not all the fragmented subpackets of the advanced interactive data packet of the specified type are completely received within a preset duration, so as to indicate transmission failure of the advanced interactive data packet of the specified type to the application server, so that the application server can confirm whether to retransmit.

A data transmission method of an embodiment of this disclosure is described below from the perspective of a policy control function (PCF).

FIG. 7 shows a flowchart of yet another data transmission method that may be performed by a PCF according to an embodiment of this disclosure. Referring to FIG. 7, the data transmission method includes at least S710 to S740, each of which will be described below.

In S710, GTP-U tunnel configuration information for advanced interactive data packets which is transmitted by an AF is received, the GTP-U tunnel configuration information being used for indicating that different types of advanced interactive data packets are transmitted in different GTP-U tunnels, and are borne by a same DRB.

In an embodiment of this disclosure, the AF may directly send the GTP-U tunnel configuration information for advanced interactive data packets to the PCF, or the AF may send the GTP-U tunnel configuration information for advanced interactive data packets to the PCF via a network exposure function (NEF).

In S720, URSP rules and PDU session management policy information are generated according to the GTP-U tunnel configuration information, the URSP rules and the PDU session management policy information being used for indicating that the different types of advanced interactive data packets are transmitted in the different GTP-U tunnels, and are borne by the same DRB.

In S730, the URSP rules are forwarded to a user equipment by an AMF, and access stratum context information is configured for a next generation nodeB according to the URSP rules, the access stratum context information being used for indicating that the different types of advanced interactive data packets are transmitted in the different GTP-U tunnels, and are borne by the same DRB.

In an embodiment of this disclosure, the AMF may directly forward the URSP rules to the user equipment; at the same time, the AMF may generate the access stratum context information to be configured to the next generation nodeB according to the URSP rules and transmits the access stratum context information to the next generation nodeB.

In S740, the PDU session management policy information is configured for a user-plane functional entity by an SMF.

In an embodiment of this disclosure, the SMF may directly forward the PDU session management policy information to the user-plane functional entity.

The PCF configures the PDU session management policy information to the user-plane functional entity, and as such, upon detection that the transmission of a fragmented subpacket of an advanced interactive data packet of a specified type to the next generation nodeB fails according to the PDU session management policy information, the user-plane functional entity stops transmitting the remaining fragmented subpackets of the advanced interactive data packet of the specified type to the next generation nodeB, so as to reduce the occupation of transmission resources. The PCF forwards the URSP rules to the user equipment, and as such, according to the URSP rules, when the user equipment detects that not all the fragmented subpackets of the advanced interactive data packet of the specified type are completely received within a preset duration, the user equipment sends a transmission failure message to an application server transmitting the advanced interactive data packet of the specified type, so as to reduce the occupation of transmission resources. The PCF forwards the access stratum context information to the next generation nodeB, and as such, when the next generation nodeB detects, according to the access stratum context information, that the transmission of a fragmented subpacket of an advanced interactive data packet of a specified type to the user equipment fails, the next generation nodeB stops transmitting the remaining fragmented subpackets of the advanced interactive data packet of the specified type to the user equipment, so as to reduce the occupation of transmission resources.

The data transmission methods of the embodiments of this disclosure are described above from the perspectives of the user-plane functional entity, the next generation nodeB, the user equipment, and the PCF. A data transmission method of an embodiment of this disclosure will be described below from the perspective of interaction between entities.

In an embodiment of this disclosure, an application server may classify advanced interactive data packets into two types (taking two types as an example, and it may also be two or more types) at an application layer, for example, I-frames and P-frames, and then the two types of advanced interactive data packets are an I-frame stream and a P-frame stream. The application server transmits the I-frame stream and the P-frame stream. Through the inter-layer interaction mechanism, the classification information is put in the message header. In an embodiment of this disclosure, the classification may also not be performed based on I-frames and P-frames, but on other rules, for example, on the priority of contents of audio and video streams, etc.

Figures 8, 9:
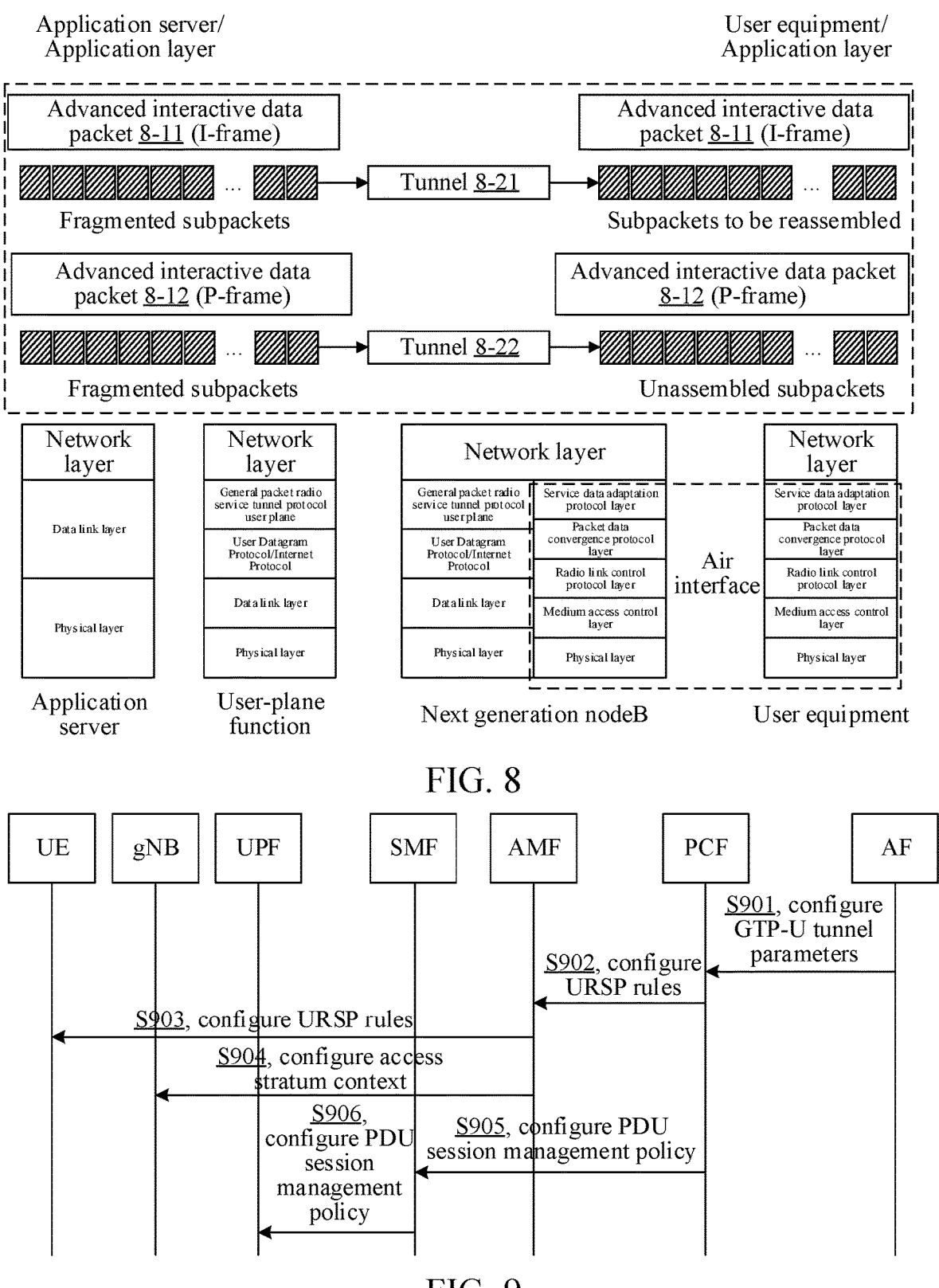
FIG. 8 shows a schematic diagram illustrating the transmission process of another advanced interactive data packet according to an embodiment of this disclosure.
FIG. 9 shows a diagram illustrating the configuration process of a control plane according to an embodiment of this disclosure.

In an embodiment of this disclosure, an AF may interact with a PCF, and then the PCF interacts with various network elements (such as AMF, SMF, etc.) to configure GTP-U tunnels for the two streams. As shown in FIG. 8, an I-frame advanced interactive data packet 8-11 and a P-frame advanced interactive data packet 8-12 are distinguished in an application layer and fragmented, and then put into different GTP-U tunnels (tunnel 8-21 and tunnel 8-22). After arriving at the gNB, they are transmitted downlink using the same DRB, and have unified packet numbers in the same DRB. In addition, when scheduling data transmission, the gNB gives the priority to the transmission of the I-frame stream (namely, a plurality of fragmented subpackets of an I-frame advanced interactive data packet). If packet loss occurs in the I-frame stream, the transmission of the fragmented subpackets of the I-frame advanced interactive data packet to the user equipment is stopped, and the received fragmented subpackets of the I-frame advanced interactive data packet and the fragmented subpackets of the subsequent P-frame advanced interactive data packet are discarded (if the I-frame is lost, the picture cannot be restored even if the P-frame is received).

In an embodiment of this disclosure, after an advanced interactive data packet of any type is fragmented, the start and end of the fragmented subpackets of the advanced interactive data packet of the type may be marked. Based on the marked start subpacket (referred to as a start data packet) and an end subpacket (referred to as an end data packet), if the transmission of some subpackets in the N fragmented subpackets of the advanced interactive data packet fail, then the subsequent subpackets do not need to be transmitted any more, and can be discarded; where N is a positive integer greater than 1.

In an embodiment of this disclosure, before managing the transmission of the subpackets, a configuration process for a control plane needs to be performed to enable the UE and each network element to obtain transmission parameters of the advanced interactive data packet, as shown in FIG. 9, including S901 to S906.

In S901, the AF configures GTP-U tunnel parameters (referred to as GTP-U tunnel configuration information) to the PCF.

In an embodiment of this disclosure, the AF may configure the GTP-U tunnel parameters by configuring a PDU session policy of the advanced interactive data packet to the PCF. The AF may directly transmit the PDU session policy of the advanced interactive data packet to the PCF, or the AF may also transmit the PDU session policy of the advanced interactive data packet to the PCF via an NEF. The GTP-U tunnel parameters indicate that different types of advanced interactive data packets are transmitted in different GTP-U tunnels, and are borne by a same DRB.

In S902, the PCF configures URSP rules to the AMF.

In an embodiment of this disclosure, the URSP rules configured by the PCF to the AMF are related to the PDU session policy, and indicate that different types of advanced interactive data packets are transmitted in different GTP-U tunnels, and are borne by a same DRB.

In S903, the AMF configures the URSP rules to a UE.

In an embodiment of this disclosure, the URSP rules configured by the AMF to the UE include: different types of advanced interactive data packets are transmitted in different GTP-U tunnels, and are borne by a same DRB.

In S904, the AMF configures an access stratum context (access stratum context information) to the gNB.

In an embodiment of this disclosure, the access stratum (AS) context configured by the AMF to the gNB is related to the PDU session policy, which is a policy that different types of advanced interactive data packets are transmitted in different GTP-U tunnels, and are borne by a same DRB.

In S905, the PCF configures a PDU session management policy (referred to as PDU session management policy information) to the SMF.

In an embodiment of this disclosure, the PDU session management policy includes a policy that different types of advanced interactive data packets are transmitted in different GTP-U tunnels, and are borne by a same DRB.

In S906, the SMF configures the PDU session management policy to the UPF.

After the configuration of the control plane is completed, the fragmented transmission (i.e., fragmented into subpackets for transmission) of the advanced interactive data packet needs to follow the following principles: for a plurality of fragmented IP subpackets (referred to as a plurality of subpackets) of a huge IP packet (namely, the advanced interactive data packet), if the transmission of some of the IP subpackets fail, then the IP subpackets which have been transmitted successfully are discarded even if they have been received by the receiver; if there are still some IP subpackets not transmitted, the sender stops the transmission, so as to start the transmission of the next advanced interactive data packet as soon as possible.

If the application server or the user equipment retransmits the advanced interactive data packet at the application layer, the retransmitted advanced interactive data packet may be determined as a new advanced interactive data packet for transmission, and the specific transmission mode is consistent with the data transmission mode provided in this embodiment of this disclosure.

Figure 10:
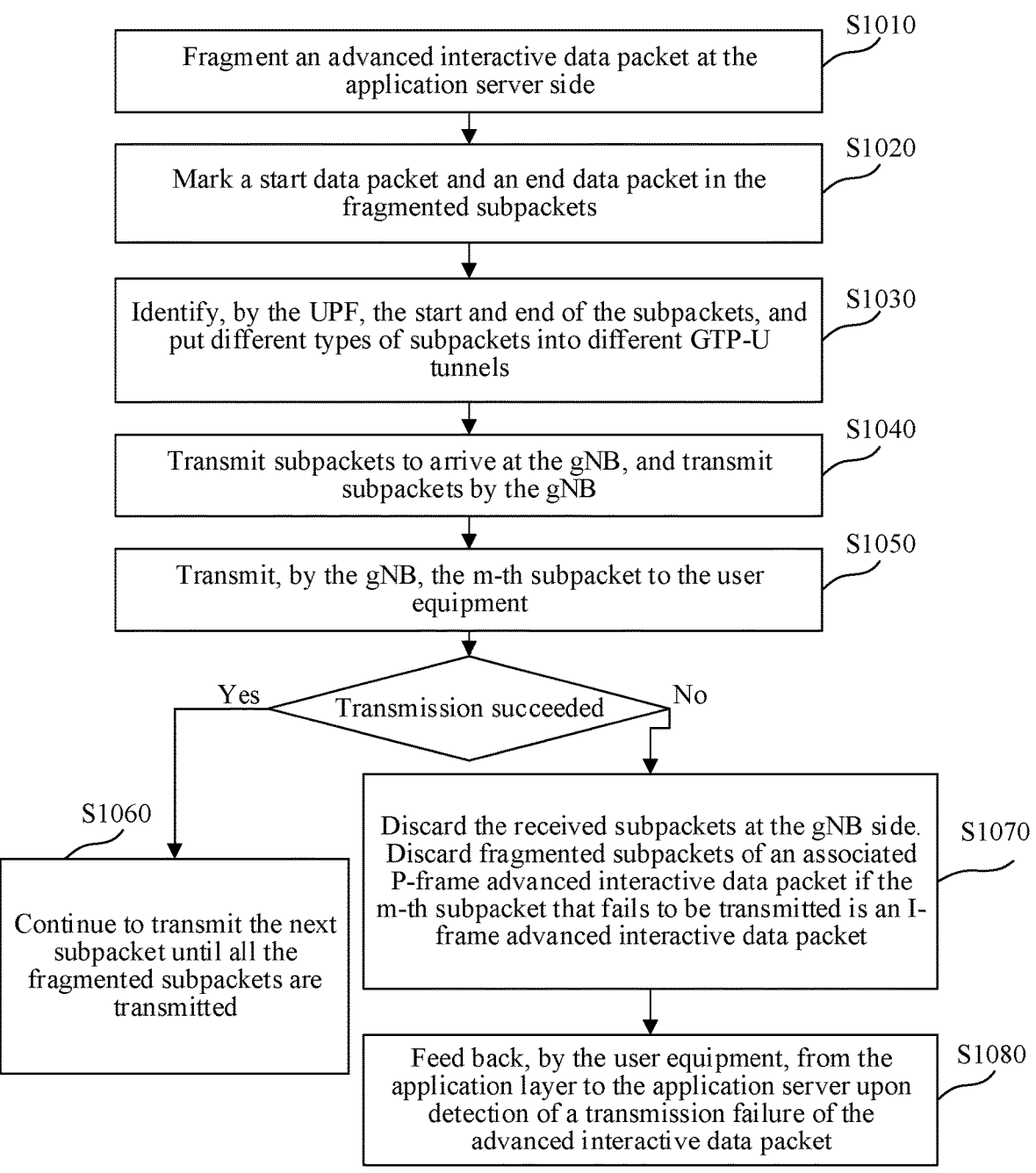
FIG. 10 shows a flowchart of an exemplary data transmission method provided by an embodiment of this disclosure.

In an embodiment of this disclosure, as shown in FIG. 10, a flowchart of an exemplary data transmission method provided by an embodiment of this disclosure may include S1010 to S1080.

In S1010, an advanced interactive data packet is fragmented at the application server side.

In an embodiment of this disclosure, the application server may determine a subpacket size according to information such as a preset subpacket size or the state of the network, and then fragment the advanced interactive data packet according to the subpacket size to obtain a plurality of subpackets.

In S1020, a start data packet and an end data packet in the fragmented subpackets are marked.

In an embodiment of this disclosure, indication information may be added to the start packet and the end packet to indicate which subpacket is the start packet and which subpacket is the end packet. The indication information may be added in a protocol field or payload information of the subpacket, such as in a field of the GTP-U tunneling protocol.

In S1030, the UPF identifies the start and end of the subpackets, and puts different types of subpackets into different GTP-U tunnels.

In an embodiment of this disclosure, during transmission of the fragmented subpackets by the application server to a UPF, the UPF may identify a start packet and an end packet therein.

In S1040, the subpackets arrive at the gNB, and transmitted by the gNB.

In an embodiment of this disclosure, after receiving the subpackets transmitted by the application server, the UPF transmits the subpackets to the gNB, and then the gNB transmits the subpackets to the user equipment. The gNB needs to perform augmentation to recognize the indication information in the subpacket to determine a start data packet and an end data packet, so as to recognize a series of fragmented subpackets of the advanced interactive data packet. At the same time, the gNB puts different types of subpackets received from different GTP-U tunnels into the same DRB for transmission to the user equipment.

In S1050, the gNB transmits the m-th subpacket to the user equipment.

M is a positive integer variable. The gNB judges whether the m-th subpacket is successfully transmitted; if so, S1060 is performed; if not, S1070 is performed. In addition, the gNB may also judge whether the m-th subpacket meets the delay requirement; if so, S1060 is performed; if not, S1070 is performed.

In an embodiment of this disclosure, the gNB may transmit subpackets to the user equipment via an air interface (Uu interface). Meanwhile, the success and failure of data transmission may be judged through the protocols of the Uu interface, such as PDCP, RLC, etc.

In S1060, continue to transmit the next subpacket until all the fragmented subpackets are transmitted.

In S1070, the received subpackets are discarded at the gNB side. The remaining subpackets transmitted by the UPF are not transmitted to the user equipment any more. If the m-th subpacket that fails to be transmitted is an I-frame advanced interactive data packet, then fragmented subpackets of an associated P-frame advanced interactive data packet are also discarded.

In S1080, the user equipment feeds back from the application layer to the application server upon detection of a transmission failure of the advanced interactive data packet. Alternatively, the transmission failure of an advanced interactive data packet of a specified type may be determined if the user equipment does not completely receive all the subpackets of the advanced interactive data packet within a certain time limit (referred to as a preset duration). The information fed back to the application server is used for indicating that the transmission of the advanced interactive data packet of the specified type has failed.

Figure 11:
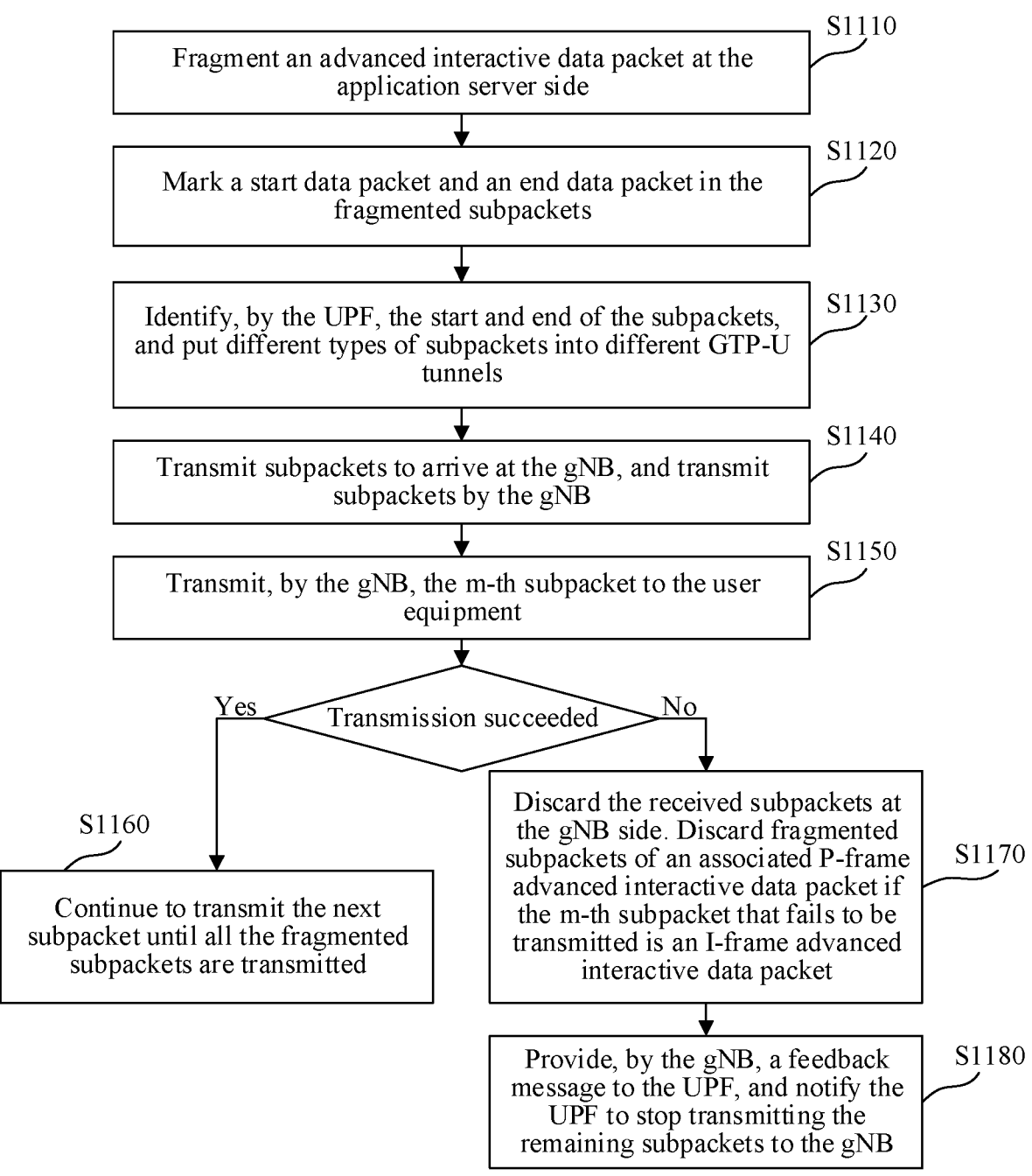
FIG. 11 shows a flowchart of another exemplary data transmission method provided by an embodiment of this disclosure.

The data transmission method shown in FIG. 10 describes a process in which the user equipment indicates a transmission failure of an advanced interactive data packet from the application layer to the application server. In an embodiment of this disclosure, the gNB may also indicate the state of transmission of an advanced interactive data packet to the UPF. As shown in FIG. 11, a data transmission method includes S1110 to S1180.

In S1110, an advanced interactive data packet is fragmented at the application server side.

In an embodiment of this disclosure, the application server may determine a subpacket size according to information such as a preset subpacket size or the state of the network, and then fragment the advanced interactive data packet according to the subpacket size to obtain a plurality of subpackets.

In S1120, a start data packet and an end data packet in the fragmented subpackets are marked.

In an embodiment of this disclosure, indication information may be added to the start packet and the end packet to indicate which subpacket is the start packet and which subpacket is the end packet. The indication information may be added in a protocol field or payload information of the data packet, such as in a field of the GTP-U tunneling protocol.

In S1130, the UPF identifies the start and end of the subpackets, and puts different types of subpackets into different GTP-U tunnels.

In an embodiment of this disclosure, during transmission of the fragmented subpackets by the application server to a UPF, the UPF may identify a start packet and an end packet therein.

In S1140, the subpackets are transmitted to arrive at the gNB, and transmitted by the gNB.

In an embodiment of this disclosure, after receiving the subpackets transmitted by the application server, the UPF transmits the subpackets to the gNB, and then the gNB transmits the subpackets to the user equipment. The gNB needs to perform augmentation to recognize the indication information in the subpacket to determine a start data packet and an end data packet, so as to recognize a series of fragmented subpackets of the advanced interactive data packet. At the same time, the gNB puts different types of subpackets received from different GTP-U tunnels into the same DRB for transmission to the user equipment.

In S1150, the gNB transmits the m-th subpacket to the user equipment.

The gNB judges whether the m-th subpacket is successfully transmitted; if so, S1160 is performed; if not, S1170 is performed. In addition, the gNB may also judge whether the m-th subpacket meets the delay requirement; if so, S1160 is performed; if not, S1170 is performed.

In an embodiment of the disclosure, the gNB may transmit subpackets to the user equipment via a Uu interface. Meanwhile, the success and failure of data transmission may be judged through the protocols of the Uu interface, such as PDCP, RLC, etc.

In S1160, continue to transmit the next subpacket until all the fragmented subpackets are transmitted.

In S1170, the received subpackets are discarded at the gNB side. The remaining subpackets transmitted by the UPF are not transmitted to the user equipment any more. If the m-th subpacket that fails to be transmitted is an I-frame advanced interactive data packet, then fragmented subpackets of an associated P-frame advanced interactive data packet are also discarded.

In S1180, the gNB provides a feedback message (referred to as a first feedback message) to the UPF, and notifies the UPF to stop transmitting the remaining subpackets to the gNB.

If the gNB has completely received all the fragmented subpackets of the advanced interactive data packet, it no longer needs to provide the feedback message to the UPF.

In an embodiment of this disclosure, the data processing methods shown in FIGS. 10 and 11 may also be combined, that is, when the user equipment detects a transmission failure of an advanced interactive data packet, a feedback is sent from the application layer to the application server, and after determining that the transmission fails, the gNB may also provide a feedback message to the UPF so as to notify the UPF to stop transmitting subpackets to the gNB.

Figures 12, 13:
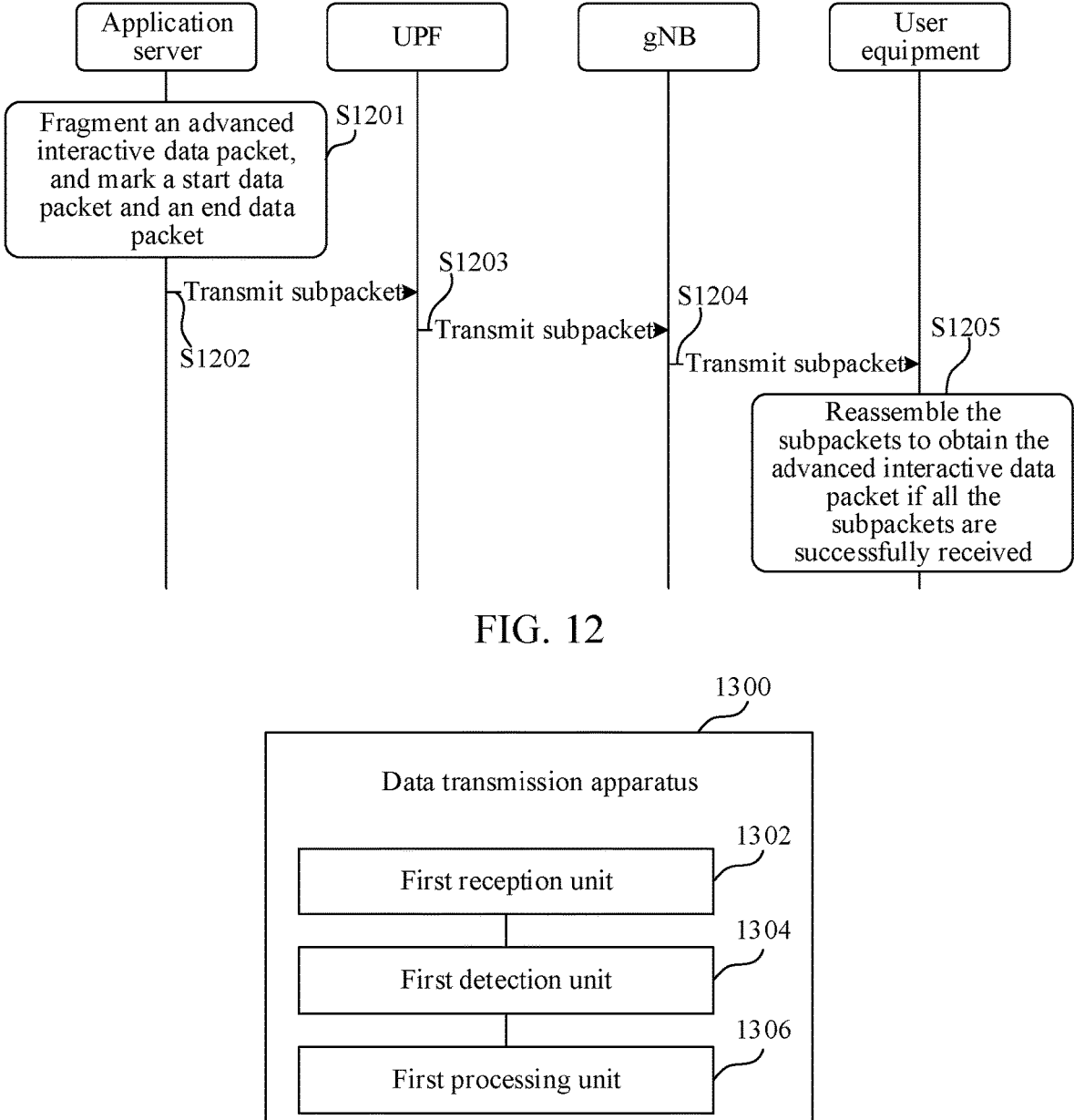
FIG. 12 shows a flowchart of yet another exemplary data transmission method provided by an embodiment of this disclosure.
FIG. 13 shows a block diagram of a data transmission apparatus according to an embodiment of this disclosure.

In an embodiment of this disclosure, after each node is configured with the transmission parameters of advanced interactive data packets, as shown in FIG. 12, an interaction flow between an application server, an UPF, a gNB and a user equipment is shown, including S1201 to S1205.

In S1201, the application server fragments an advanced interactive data packet, and marks a start data packet and an end data packet.

In an embodiment of this disclosure, indication information may be added to the start packet and the end packet to indicate which subpacket is the start packet and which subpacket is the end packet. The indication information may be added in a protocol field or payload information of the data packet, such as in a field of the GTP-U tunneling protocol.

In S1202, the application server transmits a subpacket to the UPF.

In an embodiment of this disclosure, during transmission of the fragmented subpackets by the application server to a UPF, the UPF may identify a start packet and an end packet therein.

In S1203, the UPF transmits the subpacket to the gNB.

In an embodiment of this disclosure, the UPF may put different types of subpackets into different GTP-U tunnels for transmission to the gNB.

The process of the UPF transmitting the subpacket to the gNB and the process of the application server transmitting the subpacket to the UPF may be performed synchronously. For example, the UPF may transmit a subpacket to the gNB immediately after receiving the subpacket transmitted by the application server (which has not been fully received), so as to reduce the delay of the subpacket to arrive at the user equipment. Of course, the UPF may also transmit the subpackets to the gNB after all the subpackets transmitted by the application server are received. In this way, when there is an error occurring in the receiving process of the UPF, the number of invalid subpackets transmitted to the gNB can be reduced, thereby reducing the consumption of transmission resources.

In an embodiment of this disclosure, in the process of the UPF transmitting a fragmented subpacket of an advanced interactive data packet to the gNB, if it is detected that the transmission of a fragmented subpacket of an advanced interactive data packet of a certain type (referred to as a specified type) fails or it is detected that the transmission of the subpacket exceeds a delay requirement, the UPF may stop transmitting the remaining subpackets of the advanced interactive data packet of the type to the gNB to reduce the number of invalid subpackets transmitted, thereby reducing the consumption of transmission resources. In this case, the UPF may also delete the received fragmented subpackets of the advanced interactive data packet of the type, and at the same time, the UPF may also notify the application server to stop transmitting the remaining fragmented subpackets of the advanced interactive data packet to the UPF.

In an embodiment of this disclosure, the UPF may also stop transmitting the remaining fragmented subpackets of the advanced interactive data packet of a certain type transmitted by the application server to the gNB when not all the fragmented subpackets of the advanced interactive data packet of the type are received within a preset duration, and the UPF may also delete the received fragmented subpackets of the advanced interactive data packet of the type, and at the same time, the UPF may also notify the application server to stop transmitting the remaining fragmented subpackets of the advanced interactive data packet of the type to the UPF.

In S1204, the gNB transmits the subpacket to the user equipment.

In an embodiment of this disclosure, the gNB may transmit the fragmented subpackets of different types of advanced interactive data packets to the user equipment by a same DRB.

In an embodiment of this disclosure, the process of the gNB transmitting the subpacket to the user equipment and the process of the UPF transmitting the subpacket to the gNB may be performed synchronously. For example, the gNB may transmit a subpacket to the user equipment immediately after receiving the subpacket transmitted by the UPF (which has not been fully received), so as to reduce the delay of the subpacket to arrive at the user equipment. Of course, the gNB may also transmit the subpackets to the user equipment after all the subpackets transmitted by the UPF are received. In this way, when there is an error occurring in the receiving process of the UPF, the number of invalid subpackets transmitted to the gNB can be reduced, thereby reducing the consumption of transmission resources.

In an embodiment of this disclosure, in the process of the gNB transmitting a fragmented subpacket of an advanced interactive data packet to the user equipment, if it is detected that the transmission of a fragmented subpacket of an advanced interactive data packet of a certain type fails or it is detected that the transmission of the subpacket exceeds a delay requirement, the gNB may stop transmitting the remaining subpackets of the advanced interactive data packet of the type to the user equipment to reduce the number of invalid subpackets transmitted, thereby reducing the consumption of transmission resources. In this case, the gNB may also delete the received fragmented subpackets of the advanced interactive data packet of the type, and at the same time, the gNB may also notify the UPF to stop transmitting the remaining fragmented subpackets of the advanced interactive data packet of the type to the gNB.

In an embodiment of this disclosure, when not all the fragmented subpackets of an advanced interactive data packet of a certain type transmitted by the UPF are received within a preset duration, the gNB may also stop transmitting the remaining fragmented subpackets of the advanced interactive data packet of the type to the user equipment, and the gNB may also delete the received subpackets of the advanced interactive data packet of the type, and at the same time, the gNB may also notify the UPF to stop transmitting the remaining fragmented subpackets of the advanced interactive data packet of the type to the gNB.

In S1205, if the user equipment successfully receives all the subpackets, the subpackets are reassembled to restore the advanced interactive data packet.

In an embodiment of this disclosure, if the user equipment detects a transmission failure of an advanced interactive data packet of a certain type, a feedback may be provided from the application layer to the application server.

In an embodiment of this disclosure, the transmission failure of an advanced interactive data packet of a certain type may be determined if the user equipment does not completely receive all the subpackets of the advanced interactive data packet of the type within a certain time limit. The information fed back (referred to as transmission failure information) to the application server is used for indicating that the transmission of the advanced interactive data packet of the specified type has failed.

According to the data transmission method of this embodiment of this disclosure, different types of advanced interactive data packets are transmitted in different GTP-U tunnels and correspond to the same DRB, so as to reduce the impact on the protocol side on the premise of supporting the transmission of multiple types of advanced interactive data packets. At the same time, when the transmission of a fragmented subpacket of an advanced interactive data packet fails or the transmission exceeds a delay requirement, the transmission of the remaining subpackets to a node of next level may be stopped in time, so that the occupation of bandwidth can be reduced, and thus the occupation of transmission resources by the advanced interactive data packet during transmission can be reduced.

The data transmission apparatus provided in the embodiments of this disclosure may be used to perform the data transmission method according to the embodiments of this disclosure.

FIG. 13 shows a block diagram of a data transmission apparatus that may be arranged inside a next generation nodeB accordance with an embodiment of this disclosure.

Referring to FIG. 13, a data transmission apparatus 1300 according to an embodiment of this disclosure includes: a first reception unit 1302, a first detection unit 1304, and a first processing unit 1306.

The first reception unit 1302 is configured to receive access stratum context information transmitted by an AMF, the access stratum context information being used for indicating that different types of advanced interactive data packets are transmitted in different GTP-U tunnels, and are borne by a same DRB;

the first detection unit 1304 is configured to detect, in response to recognition that a data packet transmitted by a user-plane functional entity through the GTP-U tunnel is a fragmented subpacket of an advanced interactive data packet, a state of transmission of the fragmented subpacket of the advanced interactive data packet according to the access stratum context information during transmission of the fragmented subpacket of the advanced interactive data packet to a user equipment based on the DRB; and the first processing unit 1306 is configured to stop transmission of remaining fragmented subpackets of an advanced interactive data packet of a specified type to the user equipment upon detection that transmission of a fragmented subpacket of the advanced interactive data packet of the specified type to the user equipment fails.

In an embodiment of this disclosure, the first processing unit 1306 is further configured to discard received fragmented subpackets of the advanced interactive data packet of the specified type upon detection that transmission of a fragmented subpacket of the advanced interactive data packet of the specified type to the user equipment fails.

In an embodiment of this disclosure, the first processing unit 1306 is further configured to transmit a first feedback message to the user-plane functional entity upon detection that transmission of a fragmented subpacket of the advanced interactive data packet of the specified type to the user equipment fails, the first feedback message being used for instructing the user-plane functional entity to stop transmission of remaining fragmented subpackets of the advanced interactive data packet of the specified type.

In an embodiment of this disclosure, the first processing unit 1306 is configured to transmit the first feedback message to the user-plane functional entity in a case that not all the fragmented subpackets of the advanced interactive data packet of the specified type are completely received.

In an embodiment of this disclosure, a plurality of subpackets are created by fragmentation of the advanced interactive data packet, including a start data packet and an end data packet; the start data packet includes first indication information for indicating that the start data packet is the first subpacket to be transmitted in the plurality of subpackets; the end data packet includes second indication information for indicating that the end data packet is the last subpacket to be transmitted in the plurality of subpackets.

In an embodiment of this disclosure, the first detection unit 1304 is further configured to receive the data packet transmitted by the user-plane functional entity through the GTP-U tunnel; and recognize whether the data packet is a fragmented subpacket of an advanced interactive data packet according to indication information in a protocol field of the data packet.

In an embodiment of this disclosure, the first detection unit 1304 is further configured to; or recognize whether the data packet is a fragmented subpacket of an advanced interactive data packet according to indication information in payload information of the data packet.

In an embodiment of this disclosure, the first processing unit 1306 is further configured to stop transmission of remaining fragmented subpackets of the advanced interactive data packet of the specified type to the user equipment, and discard received fragmented subpackets of the advanced interactive data packet of the specified type in a case that not all the fragmented subpackets of the advanced interactive data packet of the specified type transmitted by the user-plane functional entity are completely received within a preset duration.

In an embodiment of this disclosure, the different types of advanced interactive data packets include: advanced interactive data packets corresponding to key frames and advanced interactive data packet corresponding to non-key frames, and the advanced interactive data packet of the specified type is an advanced interactive data packet corresponding to a key frame; the first processing unit 1306 is further configured to perform at least one of the following operations upon detection that transmission of a fragmented subpacket of an advanced interactive data packet corresponding to a key frame to the user equipment fails: stop transmission of an advanced interactive data packet corresponding to a non-key frame associated with the key frame to the user equipment, and discard a received advanced interactive data packet corresponding to a non-key frame associated with the key frame.

Figure 14:
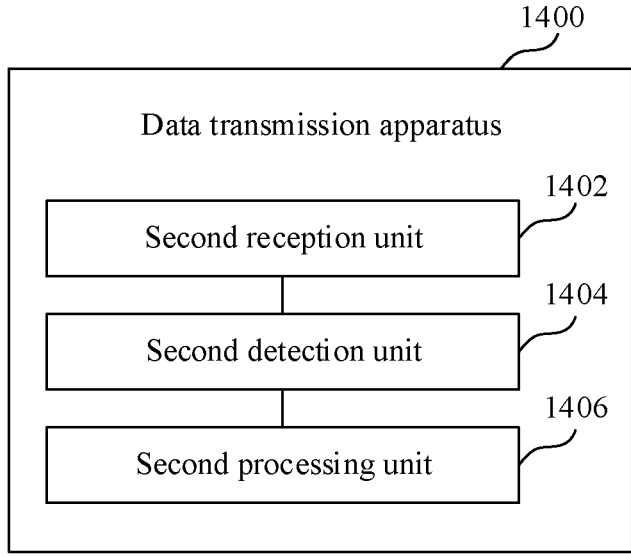
FIG. 14 shows a block diagram of another data transmission apparatus according to an embodiment of this disclosure.

FIG. 14 shows a block diagram of another data transmission apparatus that may be arranged inside a user-plane functional entity according to an embodiment of this disclosure.

Referring to FIG. 14, a data transmission apparatus 1400 according to an embodiment of this disclosure includes: a second reception unit 1402, a second detection unit 1404, and a second processing unit 1406.

The second reception unit 1402 is configured to receive protocol data unit (PDU) session management policy information transmitted by a session management function (SMF), the PDU session management policy information being used for indicating that different types of advanced interactive data packets are transmitted in different general packet radio service tunnel protocol user plane (GTP-U) tunnels, and are borne by a same data radio bearer (DRB);

the second detection unit 1404 is configured to transmit fragmented subpackets of the different types of the advanced interactive data packets to a next generation nodeB in different GTP-U tunnels according to the PDU session management policy information, and detect a state of transmission of the fragmented subpackets of the advanced interactive data packets;

the second processing unit 1406 is configured to stop transmission of remaining fragmented subpackets of an advanced interactive data packet of a specified type to the next generation nodeB upon detection that transmission of a fragmented subpacket of the advanced interactive data packet of the specified type to the next generation nodeB fails.

In an embodiment of this disclosure, the second processing unit 1406 is further configured to discard received fragmented subpackets of the advanced interactive data packet of the specified type upon detection that transmission of a fragmented subpacket of the advanced interactive data packet of the specified type to the next generation nodeB fails.

In an embodiment of this disclosure, the second processing unit 1406 is further configured to transmit a second feedback message to an application server upon detection that transmission of a fragmented subpacket of the advanced interactive data packet of the specified type to the next generation nodeB fails, the second feedback message being used for instructing the application server to stop transmission of remaining fragmented subpackets of the advanced interactive data packet of the specified type to the application server.

In an embodiment of this disclosure, the second processing unit 1406 is configured to transmit the second feedback message to the application server in a case that not all the fragmented subpackets of the advanced interactive data packet of the specified type are completely received.

In an embodiment of this disclosure, the second processing unit 1406 is further configured to stop transmission of remaining fragmented subpackets of the advanced interactive data packet of the specified type to the next generation nodeB, and discard received fragmented subpackets of the advanced interactive data packet of the specified type in a case that not all the fragmented subpackets of the advanced interactive data packet of the specified type are completely received within a preset duration.

In an embodiment of this disclosure, the different types of advanced interactive data packets include: advanced interactive data packets corresponding to key frames and advanced interactive data packet corresponding to non-key frames, and the advanced interactive data packet of the specified type is an advanced interactive data packet corresponding to a key frame;

the second processing unit 1406 is further configured to perform at least one of the following operations upon detection that transmission of a fragmented subpacket of an advanced interactive data packet corresponding to a key frame to the next generation nodeB fails: stop transmission of an advanced interactive data packet corresponding to a non-key frame associated with the key frame to the next generation nodeB, and discard a received advanced interactive data packet corresponding to a non-key frame associated with the key frame.

Figure 15:
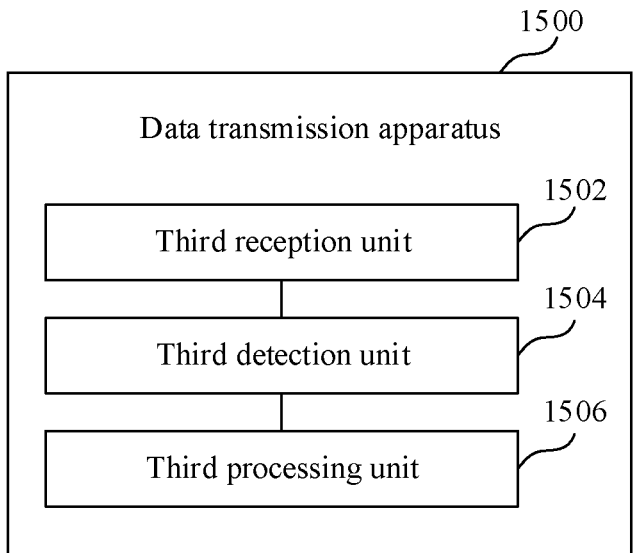
FIG. 15 shows a block diagram of yet another data transmission apparatus according to an embodiment of this disclosure.

FIG. 15 shows a block diagram of yet another data transmission apparatus that may be arranged inside a user equipment according to an embodiment of this disclosure.

Referring to FIG. 15, a data transmission apparatus 1500 according to an embodiment of this disclosure includes: a third reception unit 1502, a third detection unit 1504, and a third processing unit 1506.

The third reception unit 1502 is configured to receive user equipment route selection policy (URSP) rules transmitted by an access and mobility management function (AMF), the URSP rules being used for indicating that different types of advanced interactive data packets are transmitted in different general packet radio service tunnel protocol user plane (GTP-U) tunnels, and are borne by a same data radio bearer (DRB);

the third detection unit 1504 is configured to detect, in response to recognition that a data packet transmitted by a next generation nodeB based on the DRB is a fragmented subpacket of an advanced interactive data packet, a state of reception of all the fragmented subpacket of the advanced interactive data packet according to the URSP rules during reception of the fragmented subpacket of the advanced interactive data packet; and the third processing unit 1506 is configured to transmit a transmission failure message to an application server transmitting an advanced interactive data packet of a specified type upon detection that not all the fragmented subpackets of the advanced interactive data packet of the specified type are completely received within a preset duration, the transmission failure message being used for indicating transmission failure of the advanced interactive data packet of the specified type to the application server.

In an embodiment of this disclosure, the third processing unit 1506 is further configured to discard received fragmented subpackets of the advanced interactive data packet of the specified type upon detection that not all the fragmented subpackets of the advanced interactive data packet of the specified type are completely received within the preset duration.

In an embodiment of this disclosure, the third processing unit 1506 is further configured to perform integration processing on all the fragmented subpackets of the advanced interactive data packet of the specified type to obtain the advanced interactive data packet of the specified type in a case that all the fragmented subpackets of the advanced interactive data packet of the specified type are completely received.

In an embodiment of this disclosure, the different types of advanced interactive data packets include: advanced interactive data packets corresponding to key frames and advanced interactive data packet corresponding to non-key frames, and the advanced interactive data packet of the specified type is an advanced interactive data packet corresponding to a key frame.

Figure 16:
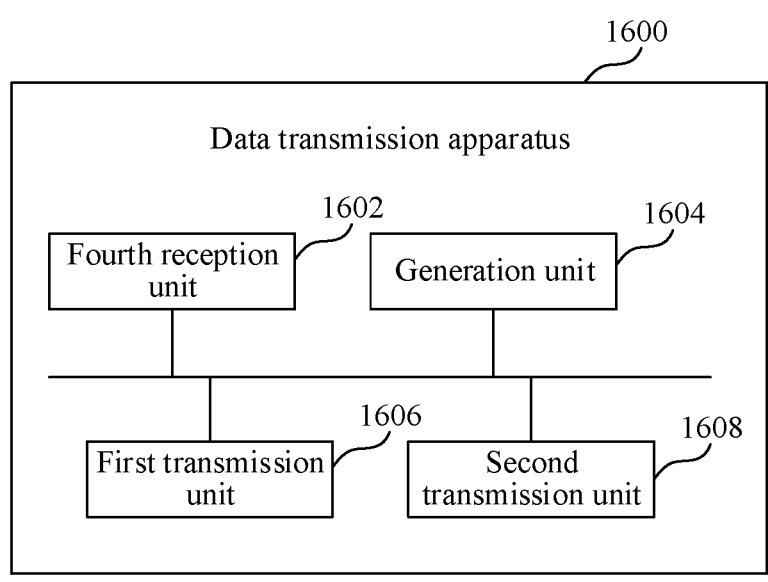
FIG. 16 shows a block diagram of still yet another data transmission apparatus according to an embodiment of this disclosure.

FIG. 16 shows a block diagram of still yet another data transmission apparatus that may be arranged inside a PCF according to an embodiment of this disclosure.

Referring to FIG. 16, a data transmission apparatus 1600 according to an embodiment of this disclosure includes: A fourth reception unit 1602, a generation unit 1604, a first transmission unit 1606, and a second transmission unit 1608.

The fourth reception unit 1602 is configured to receive general packet radio service tunnel protocol user plane (GTP-U) tunnel configuration information for advanced interactive data packets which is transmitted by an application function (AF), the GTP-U tunnel configuration information being used for indicating that different types of advanced interactive data packets are transmitted in different GTP-U tunnels, and are borne by a same data radio bearer (DRB);

the generation unit 1604 is configured to generate user equipment route policy (URSP) rules and protocol data unit (PDU) session management policy information according to the GTP-U tunnel configuration information, the URSP rules and the PDU session management policy information being used for indicating that the different types of advanced interactive data packets are transmitted in the different GTP-U tunnels, and are borne by the same DRB;

the first transmission unit 1606 is configured to forward the URSP rules to a user equipment by an access and mobility management function (AMF), and configure access stratum context information to a next generation nodeB according to the URSP rules, the access stratum context information being used for indicating that the different types of advanced interactive data packets are transmitted in the different GTP-U tunnels, and are borne by the same DRB; and the second transmission unit 1608 is configured to configure the PDU session management policy information to a user-plane functional entity by a session management function (SMF).

In an embodiment of this disclosure, the different types of advanced interactive data packets include: advanced interactive data packets corresponding to key frames and advanced interactive data packet corresponding to non-key frames, and the advanced interactive data packet of the specified type is an advanced interactive data packet corresponding to a key frame.

Figure 17:
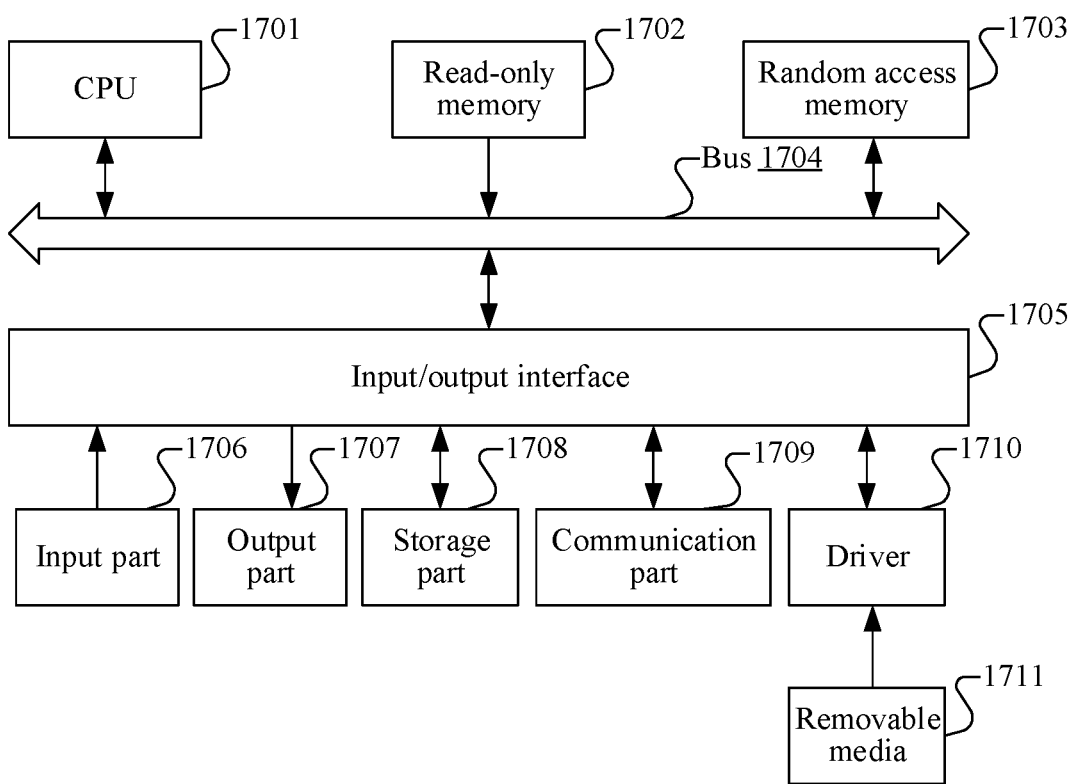
FIG. 17 shows a schematic structural diagram of an electronic device according to an embodiment of this disclosure.

FIG. 17 shows a schematic structural diagram of an electronic device according to an embodiment of this disclosure.

A computer system 1700 of the electronic device shown in FIG. 17 is merely an example, and does not constitute any limitation on functions and use ranges of the embodiments of this disclosure.

As shown in FIG. 17, the computer system 1700 includes a central processing unit (CPU) 1701 (referred to as one or more processors and including processing circuitry), which may perform various suitable actions and processing based on a program stored in a read-only memory (ROM) 1702 or a program loaded from a storage part 1708 into a random access memory (RAM) 1703 (i.e., a non-transitory computer-readable storage medium storing computer-readable instructions), for example, perform the method described in the foregoing embodiments. The RAM 1703 further stores various programs and data required for operating the system. The CPU 1701, the ROM 1702, and the RAM 1703 are connected to each other through a bus 1704. An input/output (I/O) interface 1705 is also connected to the bus 1704.

The following components are connected to the I/O interface 1705: an input part 1706 including a keyboard, a mouse, or the like, an output part 1707 including a cathode ray tube (CRT), a liquid crystal display (LCD), a speaker, or the like, a storage part 1708 including a hard disk, or the like, and a communication part 1709 including a network interface card such as a local area network (LAN) card or a modem. The communication part 1709 performs communication processing by using a network such as the Internet. A drive 1710 is also connected to the I/O interface 1705 as required. A removable medium 1711, such as a magnetic disk, an optical disc, a magneto-optical disk, and a semiconductor memory, is mounted on the drive 1710 as required, so that a computer program read from the removable medium is installed into the storage part 1708 as required.

In an embodiment of this disclosure, the data processing method provided by an embodiment of this disclosure may be implemented as a computer software program. For example, an embodiment of this disclosure includes a computer program product, including a computer program stored in a computer-readable storage medium, the computer program including a computer program used for performing the data processing method provided in the embodiments of this disclosure. In this case, by using the communication part 1709, the computer program may be downloaded and installed on a network, and/or installed from the removable medium 1711. When the computer program is executed by the central processing unit (CPU) 1701, the data processing method provided in the embodiments of this disclosure is performed.

The computer-readable storage medium provided in the embodiments of this disclosure may be, for example, but is not limited to, an electric, magnetic, optical, electromagnetic, infrared, or semi-conductive system, apparatus, or component, or any combination thereof. The computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the embodiments of this disclosure, the computer-readable storage medium may be any tangible medium including or storing a program, and the program may be used by or used in combination with an instruction execution system, an apparatus, or a device. In the embodiments of this disclosure, the computer-readable storage medium may alternatively be a computer-readable signal medium that includes a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable storage medium may be any computer-readable medium. The computer-readable storage medium may send, propagate or transmit a program that is used by or used in combination with an instruction execution system, apparatus or device. The computer program included in the computer-readable storage medium may be transmitted by using any suitable medium, including but not limited to: a wireless medium, a wired medium, or the like, or any suitable combination thereof.

The flowcharts and block diagrams in the accompanying drawings provided in the embodiments of this disclosure illustrate possible system architectures, functions, and operations that may be implemented by a system, a method, and a computer program product according to the embodiments of this disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units involved in the embodiments of this disclosure may be implemented in a software manner, or may be implemented in a hardware manner, and the unit described can also be set in a processor. Names of these units do not constitute a limitation on the units in a case.

An embodiment of this disclosure further provides a computer-readable storage medium. The computer-readable storage medium may be included in the electronic device described in the foregoing embodiments, or may exist alone and is not disposed in the electronic device. The computer-readable medium carries one or more programs, the one or more programs, when executed by the electronic device, causing the electronic device to implement the data transmission method in the embodiments of this disclosure.

Although several modules or units of an electronic device for action execution are mentioned in the descriptions of the embodiments of this disclosure, the division is not mandatory. Actually, according to the implementations of the embodiments of this disclosure, the features and functions of two or more modules or units described in the embodiments of this disclosure may be specified in one module or unit. Conversely, the features and functions of one module or unit described in the embodiments of this disclosure may be further divided into a plurality of modules or units to be embodied.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A data transmission method, comprising:
receiving access stratum context information transmitted by an access and mobility management function (AMF), the access stratum context information indicating that different types of service packets of an interactive service are transmitted in different general packet radio service tunnel protocol user plane (GTP-U) tunnels, and are transmitted by a same data radio bearer (DRB);
in response to a determination that a data packet transmitted by a user-plane functional entity through a first GTP-U tunnel is a fragmented subpacket of a first service packet of the interactive service, determining a state of transmission of the fragmented subpacket according to the access stratum context information during transmission of the fragmented subpacket to a user equipment on the DRB; and
in response to a determination that the transmission of the fragmented subpacket of the first service packet of the interactive service to the user equipment has failed:
stopping transmission of remaining fragmented subpackets of the first service packet in the first GTP-U tunnel of the different GTP-U tunnels to the user equipment, and
stopping transmission of fragmented subpackets of a second service packet of a different type of the interactive service in a second GTP-U tunnel of the different GTP-U tunnels to the user equipment, restoration of content of the second service packet being based on restoration of content of the first service packet.

2. The data transmission method according to claim 1, wherein the data transmission method further comprises:
in response to the determination that the transmission of the fragmented subpacket of the first service packet of the interactive service to the user equipment has failed, discarding received fragmented subpackets of the first service packet.

3. The data transmission method according to claim 1, wherein the data transmission method further comprises:
in response to the determination that the transmission of the fragmented subpacket of the first service packet of the interactive service to the user equipment has failed, transmitting a first feedback message to the user-plane functional entity, the first feedback message instructing the user-plane functional entity to stop the transmission of the remaining fragmented subpackets of the first service packet.

4. The data transmission method according to claim 3, wherein the transmitting the first feedback message comprises:
transmitting the first feedback message to the user-plane functional entity in response to a determination that not all fragmented subpackets of the first service packet are completely received.

5. The data transmission method according to claim 1, wherein
a plurality of subpackets are created by fragmentation of the first service packet of the interactive service, including a start subpacket and an end subpacket,
the start subpacket includes first indication information indicating that the start subpacket is transmitted first in the plurality of subpackets, and
the end subpacket includes second indication information indicating that the end subpacket is transmitted last in the plurality of subpackets.

6. The data transmission method according to claim 1, wherein the data transmission method further comprises:
receiving the data packet transmitted by the user-plane functional entity through the first GTP-U tunnel; and
recognizing whether the received data packet is the fragmented subpacket of the first service packet of the interactive service according to
first indication information in a protocol field of the received data packet or
second indication information in payload information of the received data packet.

7. The data transmission method according to claim 1, wherein the data transmission method further comprises:
in response to a determination that not all of the fragmented subpackets of the data packets associated with the first service packet transmitted by the user-plane functional entity are completely received within a preset duration:
stopping the transmission of the remaining fragmented subpackets of the first service packet to the user equipment, and
discarding received fragmented subpackets of the first service packet.

8. The data transmission method according to claim 1, wherein
the first service packet corresponds to a key frame or an intra picture frame, and
the second service packet corresponds to a non-key frame, a predictive frame, or a bi-directional interpolated prediction frame.

9. A data transmission apparatus, comprising:
processing circuitry configured to:
receive access stratum context information transmitted by an access and mobility management function (AMF), the access stratum context information indicating that different types of service packets of an interactive service are transmitted in different general packet radio service tunnel protocol user plane (GTP-U) tunnels, and are transmitted by a same data radio bearer (DRB);
in response to a determination that a data packet transmitted by a user-plane functional entity through a first GTP-U tunnel is a fragmented subpacket of a first service packet of the interactive service, determine a state of transmission of the fragmented subpacket according to the access stratum context information during transmission of the fragmented subpacket to a user equipment on the DRB; and
in response to a determination that the transmission of the fragmented subpacket of the first service packet of the interactive service to the user equipment has failed:
stop transmission of remaining fragmented subpackets of the first service packet in the first GTP-U tunnel of the different GTP-U tunnels to the user equipment, and
stop transmission of fragmented subpackets of a second service packet of a different type of interactive service in a second GTP-U tunnel of the different GTP-U tunnels to the user equipment, restoration of content of the second service packet being based on restoration of content of the first service packet.

10. The data transmission apparatus according to claim 9, wherein the processing circuitry is further configured to:
in response to the determination that the transmission of the fragmented subpacket of the first service packet of the interactive service to the user equipment has failed, discard received fragmented subpackets of the first service packet.

11. The data transmission apparatus according to claim 9, wherein the processing circuitry is further configured to:
in response to the determination that the transmission of the fragmented subpacket of the first service packet of the interactive service to the user equipment has failed, transmit a first feedback message to the user-plane functional entity, the first feedback message instructing the user-plane functional entity to stop the transmission of the remaining fragmented subpackets of with the first service packet.

12. The data transmission apparatus according to claim 11, wherein the processing circuitry is further configured to:
transmit the first feedback message to the user-plane functional entity in response to a determination that not all fragmented subpackets of the first service packet are completely received.

13. The data transmission apparatus according to claim 9, wherein
a plurality of subpackets are created by fragmentation of the first service packet of the interactive service, including a start subpacket and an end subpacket,
the start subpacket includes first indication information indicating that the start subpacket is transmitted first in the plurality of subpackets, and
the end subpacket includes second indication information indicating that the end subpacket is transmitted last in the plurality of subpackets.

14. The data transmission apparatus according to claim 9, wherein the processing circuitry is further configured to:
receive the data packet transmitted by the user-plane functional entity through the first GTP-U tunnel; and recognize whether the received data packet is the fragmented subpacket of the first service packet of the interactive service according to first indication information in a protocol field of the received data packet or second indication information in payload information of the received data packet.

15. The data transmission apparatus according to claim 9, wherein the processing circuitry is further configured to:

in response to a determination that not all of the fragmented subpackets of the first service packet transmitted by the user-plane functional entity are completely received within a preset duration:

stop the transmission of the remaining fragmented subpackets of the first service packet to the user equipment, and discard received fragmented subpackets of the first service packet.

16. The data transmission apparatus according to claim 9, wherein the first service packet corresponds to a key frame or an intra picture frame, and the second service packet corresponds to a non-key frame, a predictive frame, or a bi-directional interpolated prediction frame.

17. A non-transitory computer-readable storage medium storing computer-readable instructions thereon, which, when executed by processing circuitry, cause the processing circuitry to perform a data transmission method, comprising:

receiving access stratum context information transmitted by an access and mobility management function (AMF), the access stratum context information indicating that different types of service packets of an interactive service are transmitted in different general packet radio service tunnel protocol user plane (GTP-U) tunnels, and are transmitted by a same data radio bearer (DRB);

in response to a determination that a data packet transmitted by a user-plane functional entity through a first GTP-U tunnel is a fragmented subpacket of a first service packet of the interactive service, determining a state of transmission of the fragmented subpacket according to the access stratum context information during transmission of the fragmented subpacket to a user equipment on the DRB; and in response to a determination that the transmission of the fragmented subpacket of the first service packet of the interactive service to the user equipment has failed:

stopping transmission of remaining fragmented subpackets of the first service packet in the first GTP-U tunnel of the different GTP-U tunnels to the user equipment, and stopping transmission of fragmented subpackets of a second service packet of a different type of the interactive service in a second GTP-U tunnel of the different GTP-U tunnels to the user equipment, restoration of content of the second service packet being based on restoration of content of the first service packet.

18. The non-transitory computer-readable storage medium according to claim 17, wherein the data transmission method further comprises:

in response to the determination that the transmission of the fragmented subpacket of the first service packet of the interactive service to the user equipment has failed, discarding received fragmented subpackets of the first service packet.

19. The non-transitory computer-readable storage medium according to claim 17, wherein the data transmission method further comprises:

in response to the determination that the transmission of the fragmented subpacket of the first service packet of the interactive service to the user equipment has failed, transmitting a first feedback message to the user-plane functional entity, the first feedback message instructing the user-plane functional entity to stop the transmission of the remaining fragmented subpackets of the first service packet.

20. The non-transitory computer-readable storage medium according to claim 19, wherein the transmitting the first feedback message comprises:

transmitting the first feedback message to the user-plane functional entity in response to a determination that not all fragmented subpackets of the first service packet are completely received.

* * * * *